(12) United States Patent
Wong et al.

(10) Patent No.: US 12,373,206 B2
(45) Date of Patent: Jul. 29, 2025

(54) METHODS, SYSTEMS, AND APPARATUSES TO OPTIMIZE CROSS-LANE PACKED DATA INSTRUCTION IMPLEMENTATION ON A PARTIAL WIDTH PROCESSOR WITH A MINIMAL NUMBER OF MICRO-OPERATIONS

(71) Applicant: Intel Corporation, Santa Clara, CA (US)

(72) Inventors: Wing Shek Wong, Austin, TX (US); Kameswar Subramaniam, Austin, TX (US); Eric Quintana, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 924 days.

(21) Appl. No.: 17/134,100

(22) Filed: Dec. 24, 2020

(65) Prior Publication Data

US 2022/0206791 A1 Jun. 30, 2022

(51) Int. Cl.
*G06F 9/30* (2018.01)
*G06F 9/22* (2006.01)
*G06F 9/38* (2018.01)

(52) U.S. Cl.
CPC .......... *G06F 9/223* (2013.01); *G06F 9/30036* (2013.01); *G06F 9/30038* (2023.08); *G06F 9/3836* (2013.01); *G06F 9/3838* (2013.01)

(58) Field of Classification Search
CPC ....... G06F 9/223; G06F 9/3836; G06F 9/3838
See application file for complete search history.

(56) References Cited

U.S. PATENT DOCUMENTS

| | | | | |
|---|---|---|---|---|
| 5,974,523 A * | 10/1999 | Glew | .................. | G06F 9/30145 712/E9.046 |
| 6,233,671 B1 * | 5/2001 | Abdallah | ............ | G06F 9/30036 712/E9.034 |
| 6,581,154 B1 * | 6/2003 | Zaidi | .................. | G06F 9/30036 712/210 |
| 2012/0023314 A1 * | 1/2012 | Crum | .................... | G06F 9/3838 712/216 |
| 2021/0191721 A1 * | 6/2021 | Perry | .................. | G06F 9/30043 |

\* cited by examiner

*Primary Examiner* — Jacob Petranek
(74) *Attorney, Agent, or Firm* — NICHOLSON DE VOS WEBSTER & ELLIOTT LLP

(57) ABSTRACT

Systems, methods, and apparatuses relating to circuitry to implement a cross-lane packed data instruction on a partial (e.g., half) width processor with a minimal number of micro-operations are described. In one embodiment, a hardware processor core includes a decoder circuit to decode a single packed data instruction into only a first micro-operation and a second micro-operation, a packed data execution circuit to execute the first micro-operation and the second micro-operation, and a reservation station circuit coupled between the decoder circuit and the packed data execution circuit, the reservation station circuit comprising a first reservation station entry for the first micro-operation to store a first set of fields that indicate three or more input sources and a first destination, and a second reservation station entry for the second micro-operation to store a second set of fields to indicate three or more input sources and a second destination.

18 Claims, 18 Drawing Sheets

500

```
┌─────────────────────────────────────────────────────────────────────┐
│ DECODING A SINGLE PACKED DATA INSTRUCTION INTO ONLY A FIRST MICRO-  │
│ OPERATION AND A SECOND MICRO-OPERATION WITH A DECODER CIRCUIT OF A  │
│ PROCESSOR COMPRISING A RESERVATION STATION CIRCUIT COUPLED BETWEEN THE │
│    DECODER CIRCUIT AND A PACKED DATA EXECUTION CIRCUIT              │
│                              502                                    │
└─────────────────────────────────────────────────────────────────────┘
                                  ▼
┌─────────────────────────────────────────────────────────────────────┐
│ ALLOCATING A FIRST RESERVATION STATION ENTRY IN THE RESERVATION STATION │
│   CIRCUIT FOR THE FIRST MICRO-OPERATION HAVING A FIRST SET OF FIELDS THAT │
│       INDICATE THREE OR MORE INPUT SOURCES AND A FIRST DESTINATION  │
│                              504                                    │
└─────────────────────────────────────────────────────────────────────┘
                                  ▼
┌─────────────────────────────────────────────────────────────────────┐
│ ALLOCATING A SECOND RESERVATION STATION ENTRY IN THE RESERVATION STATION │
│ CIRCUIT FOR THE SECOND MICRO-OPERATION HAVING A SECOND SET OF FIELDS THAT │
│      INDICATE THREE OR MORE INPUT SOURCES AND A SECOND DESTINATION  │
│                              506                                    │
└─────────────────────────────────────────────────────────────────────┘
                                  ▼
┌─────────────────────────────────────────────────────────────────────┐
│ EXECUTING THE FIRST MICRO-OPERATION AND THE SECOND MICRO-OPERATION FROM │
│ THE RESERVATION STATION CIRCUIT WITH THE PACKED DATA EXECUTION CIRCUIT OF │
│                          THE PROCESSOR                              │
│                              508                                    │
└─────────────────────────────────────────────────────────────────────┘
```

FIG. 5

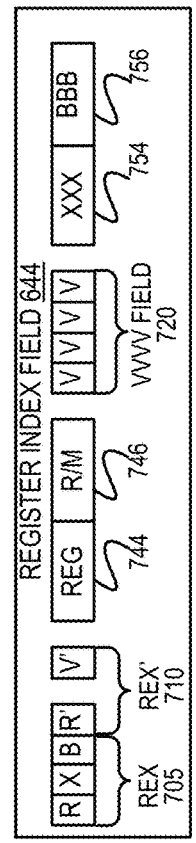
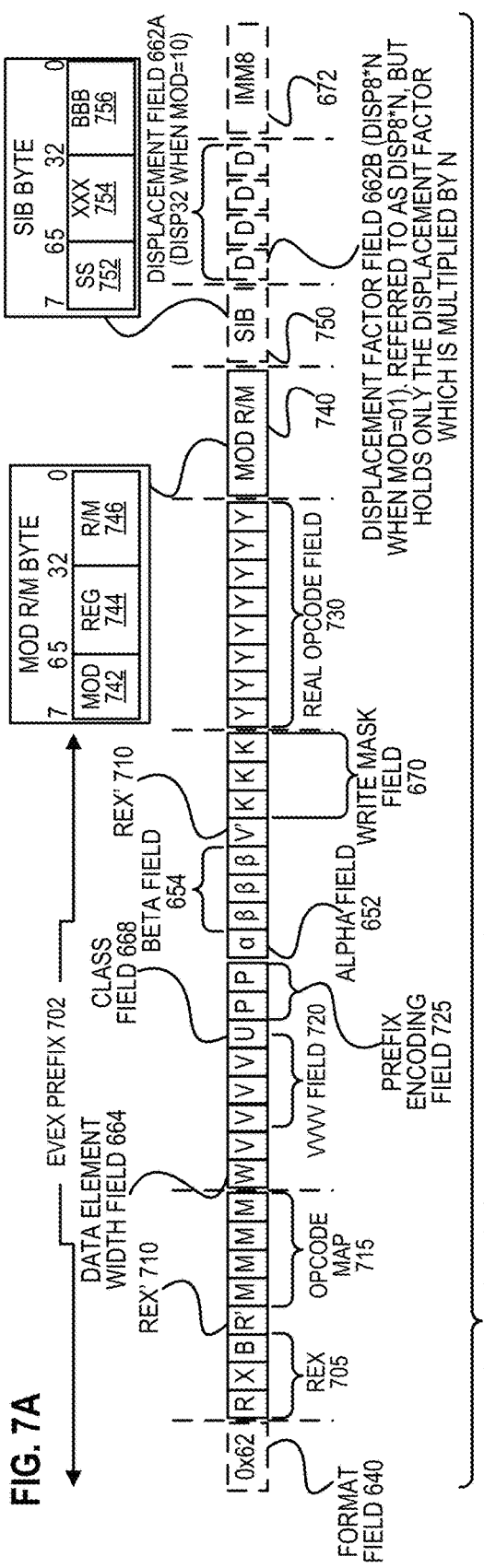
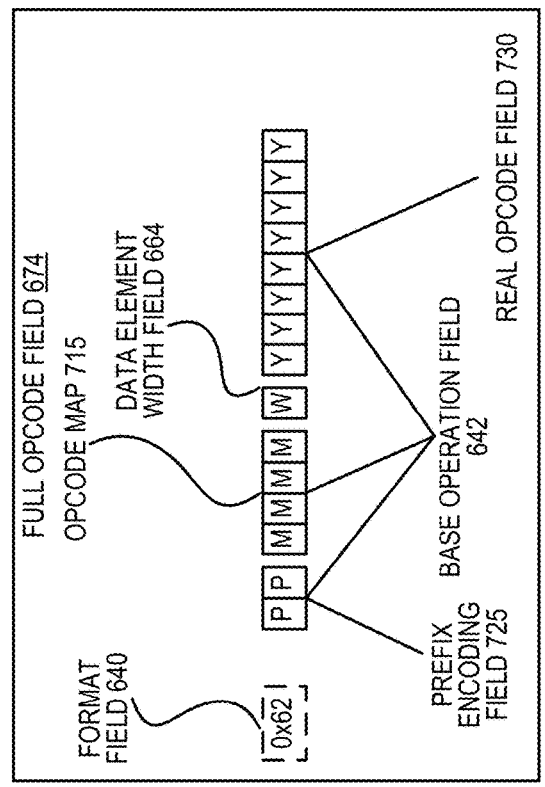
FIG. 7A
FIG. 7B
FIG. 7C

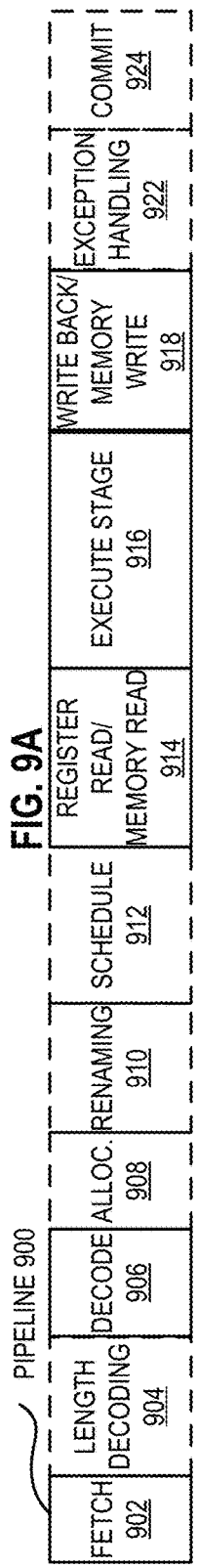
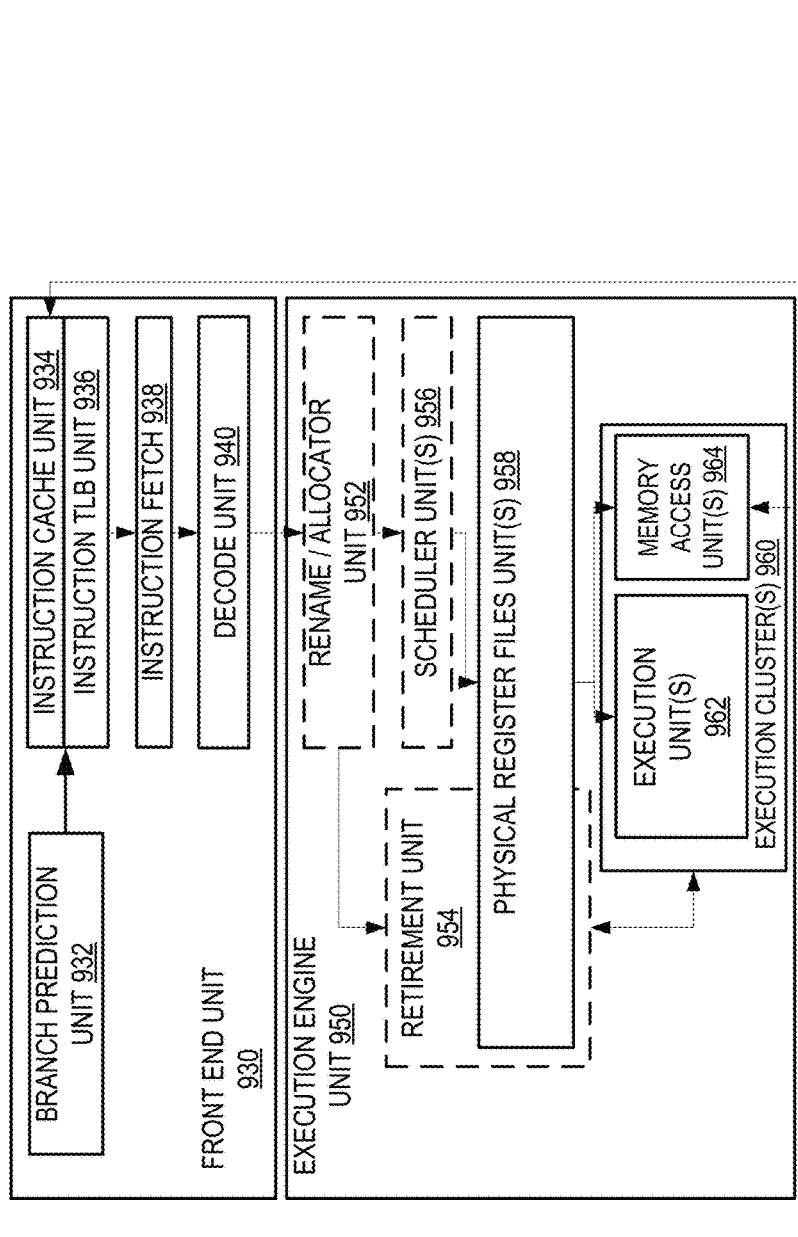
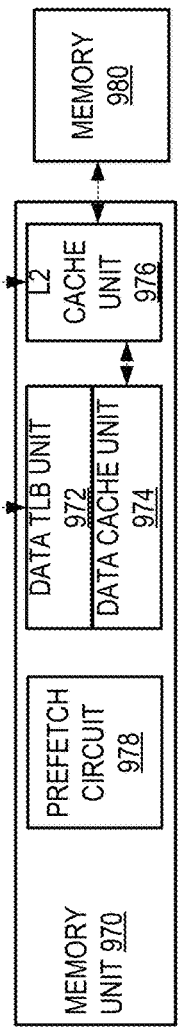
FIG. 9A
FIG. 9B

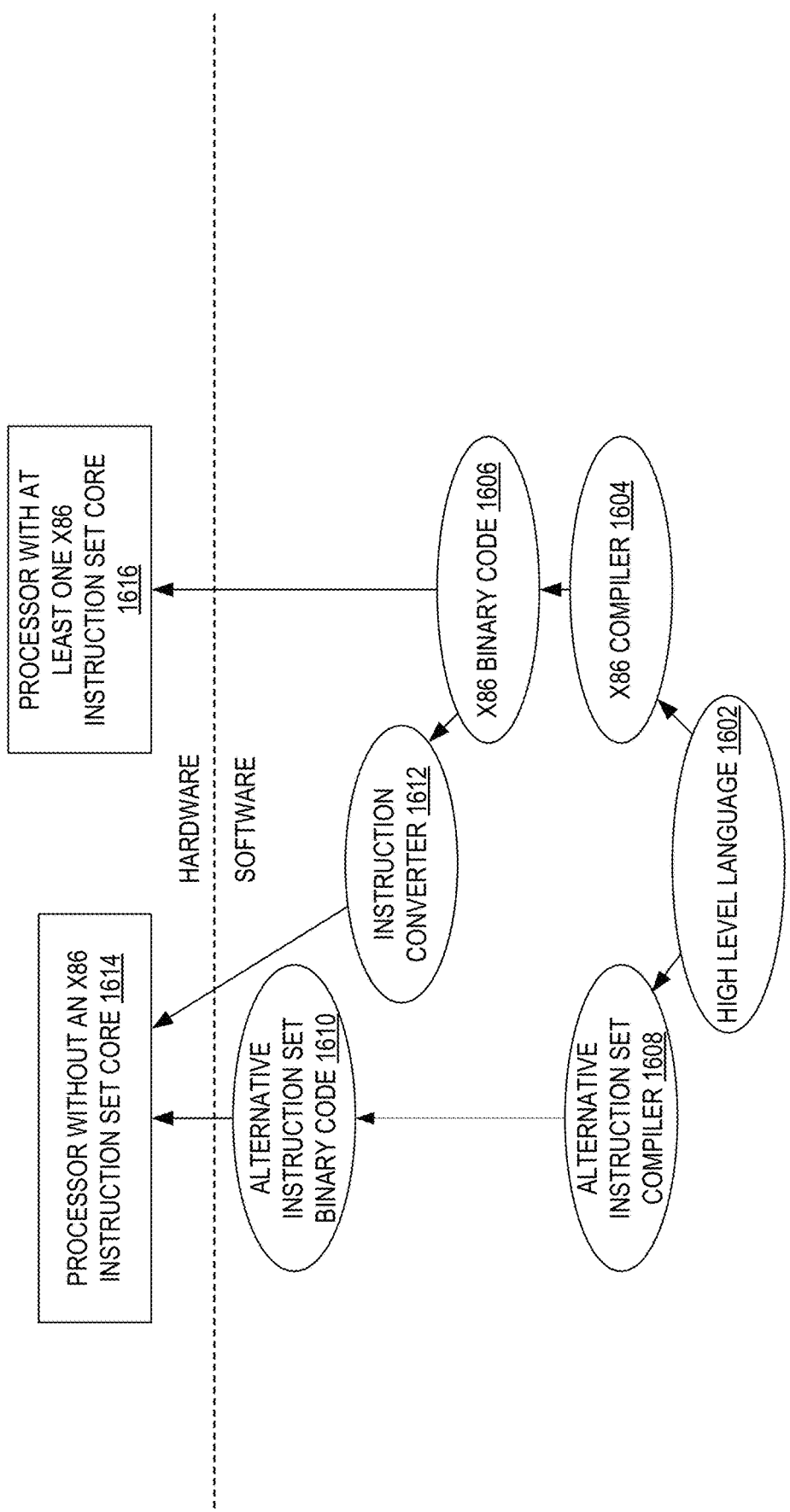

METHODS, SYSTEMS, AND APPARATUSES TO OPTIMIZE CROSS-LANE PACKED DATA INSTRUCTION IMPLEMENTATION ON A PARTIAL WIDTH PROCESSOR WITH A MINIMAL NUMBER OF MICRO-OPERATIONS

TECHNICAL FIELD

The disclosure relates generally to electronics, and, more specifically, an embodiment of the disclosure relates to circuitry to implement a cross-lane packed data instruction on a partial (e.g., half) width processor with a minimal number of micro-operations.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 5 is a flow diagram illustrating operations for processing a cross-lane packed data instruction according to embodiments of the disclosure.

FIG. 7A is a block diagram illustrating fields for the generic vector friendly instruction formats in FIGS. 6A and 6B according to embodiments of the disclosure.

FIG. 7B is a block diagram illustrating the fields of the specific vector friendly instruction format in FIG. 7A that make up a full opcode field according to one embodiment of the disclosure.

FIG. 7C is a block diagram illustrating the fields of the specific vector friendly instruction format in FIG. 7A that make up a register index field according to one embodiment of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

FIG. 16 is a block diagram contrasting the use of a software instruction converter to convert binary instructions in a source instruction set to binary instructions in a target instruction set according to embodiments of the disclosure.

DETAILED DESCRIPTION

Figure 1:
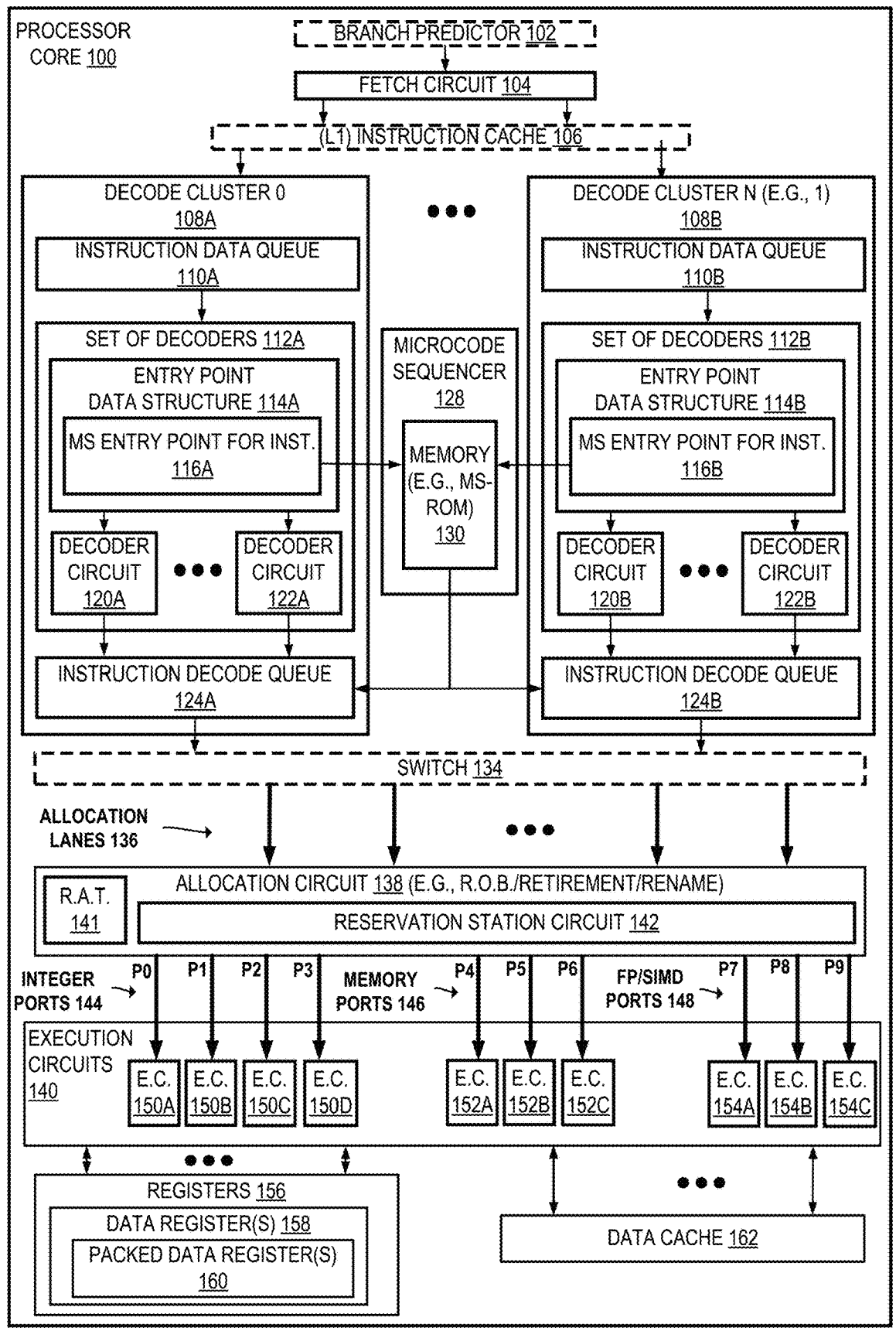
FIG. 1 illustrates a processor core having circuitry for processing a cross-lane packed data instruction according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute (e.g., user-level) instructions (e.g., a thread of instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain embodiments, a processor includes circuitry (e.g., one or more decoder circuits) to translate (e.g., decode) an instruction into one or more micro-operations (μops or micro-ops), for example, with these micro-operations directly executed by the hardware (e.g., by execution circuits). One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one embodiment, the instructions are 64 bit and/or 32 bit instructions of an instruction set architecture (ISA). In one embodiment, the instructions are (e.g., 64 bit and/or 32 bit) instructions of an Intel® instruction set architecture (ISA). In certain embodiments, the translation of an instruction into one or more micro-operations is associated with the instruction fetch and/or decode portion of a processor's pipeline.

Certain processors support an ISA having one or more packed data instructions, for example, referred to as single instruction, multiple data (SIMD) instructions or vector (e.g., operating on one or more vectors that each have multiple data elements) of instructions, e.g., as indicated by their opcode. However, a processor may not support a full width of packed data (e.g., vector) that is supported by an ISA. An ISA may include instructions having input/output operands of packed data (e.g., vectors) that have a width that is (i) wider than a data-width of its (e.g., packed data) execution circuits and/or (ii) wider than the width of the data lanes (e.g., sets of wires) going to and/or from components in the processor. In one embodiment, a packed data instruction's format indicates a width of packed data (e.g., a vector width) to be processed (e.g., a width of its operand(s)), but it is desired to implement that instruction on a processor (e.g., processor core) that has a narrower width. For example, it may be desired to implement a 256 bit wide instruction, or set of such instructions, and/or 512 bit wide instruction, or set of such instructions, (e.g., 256 bit wide Intel AVX2 instruction set and/or 512 bit wide AVX512 instruction set) on a (e.g., partial width) processor that has narrower physical resources, e.g., has narrower native physical registers, data-paths, etc. Such implementation may thus require optimized implementation to achieve best performance. Current examples include implementing a 256-bit wide instruction set (e.g., extension) (e.g., AVX2) on a 128-bit wide processor (e.g., core) or a 512-bit wide instruction set (e.g., extension) (e.g., AVX512) on a 256-bit wide or 128-bit wide processor (e.g., core). These are examples and it should be understood that other numbers are possible, for example, implementing a 1024-bit wide instruction on a processor having narrower physical resources.

Embodiments herein allow processing of a cross-lane packed data instruction from any ISA (e.g., x86, ARM, RISC-V, etc.) on a processor with narrower (e.g., data-path) width (e.g. ½ width, ¼ width, etc.).

An example packed data instruction (with mnemonic of INST) can be written as

INST MM0, MM1, MM2 where, MM0 is a first source register that is also the destination register, MM1 is a second source register, and MM2 is a third source register, e.g., where the registers are 256-bit wide (e.g., YMM) or 512-bit wide (e.g., ZMM).

In certain embodiments, packed data instructions can be broadly divided into two categories, non-cross-lane instructions and cross-lane instructions, for example, a non-cross-lane instruction (e.g., an add packed double-precision floating-point values (ADDPD) instruction) that computes each individual element of result vector from corresponding elements of input vector, e.g., on a per vector (or lane) basis. In certain embodiments each result (e.g., for a given element index in a vector) for a single non-cross-lane instruction only depends on the corresponding elements (or a corresponding lane) in the sources, such that the single non-cross-lane instruction can be decomposed into independent, multiple source (e.g., two, three, etc.) micro-operations (e.g., micro-micro-operations) of native machine width for execution, and thus scale well with machine width.

However, in certain embodiments a cross-lane packed data (e.g., vector) instruction computes an element of its resultant using some or all elements of an input vector belonging to other element(s) (or lane(s)), e.g., such that a cross-lane packed data instruction cannot be decomposed into independent micro-operations of native machine width for execution. Example cross-lane packed data instructions may include one or more of cryptographic (e.g., Secure Hash Algorithm (SHA), such as, but not limited to, SHA-256 or SHA-512), permute, shuffle, convert, broadcast, compress, or insert instructions.

In certain embodiments, the computation of each result for a cross-lane packed data instruction requires reading more than three (e.g., renamed) native width sources that are naturally available to a reservation station. For example, a first instruction that performs a permute operation (e.g., VPERM2I128 ymm0, ymm1, ymm2, imm8) to permute data elements from a first input register (e.g., 256-bit wide ymm1) and a second input register (e.g., 256-bit wide ymm2) using controls from an immediate (e.g., imm8) and stores the results in a third register (e.g., 256-bit wide ymm0), thus requiring four native width reads to read both first and second input registers that each have a width (e.g., 256-bit wide) that is wider than the data-path width (e.g., 128-bit wide) of the processor (e.g., core, execution circuit, etc.) that the instruction is being processed by, to compute each (e.g., 128-bit) section (e.g., element) of the result. For example, a second cross-lane packed data instruction that performs one or more rounds (e.g., 2 rounds) of a set of cryptographic hash functions on three packed data (e.g., vector) registers as inputs, and thus requires reading all (e.g., 256-bit wide) three register sources to compute the result, although in certain embodiments because only the lower half (e.g., 128-bits) of one of the source registers (e.g., ymm2) is used as source, thus requiring five native width reads to read first and second input registers and a portion (e.g., half) of the third input register that each have a width (e.g., 256-bit wide) that is wider than the data-path width (e.g., 128-bit wide) of the processor (e.g., core, execution circuit, etc.) that the instruction is being processed by, to compute each (e.g., 128-bit) section (e.g., element) of the result. As another example, certain packed data (e.g., AVX2) instructions generates results to 256-bit destination registers, which requires that a write back to 128-bit registers is required in a native 128-bit machine.

Thus, in certain embodiments, four or more (e.g., 128-bit) native width register operand reads are used to compute each element of the result (e.g., vector) for a cross-lane packed data instruction having two or three input operands of a larger width (e.g., 256 bit or 512 bit) by a processor having that smaller native (e.g., 128-bit) width. However, working on so many native width sources (e.g., and destination(s)) would logically require a sequence of three or more micro-operations to perform the many native machine width operations in certain embodiments, e.g., which would increase the latency and complexity.

Embodiments herein break a single (e.g., cross-lane) instruction into a plurality of (e.g., only two) micro-operations without utilizing a microcode sequencer, e.g., as the ideal implementation for such an instruction. For example, with the plurality of (e.g., only two) micro-operations generated directly by a decoder circuit instead of produced by a microcode sequencer (see, e.g., microcode sequencer 128 in FIG. 1). In certain embodiments, generating a microcode sequence for an instruction by a microcode sequencer (e.g., circuit) suffers from entry and exit latency penalty, e.g., and is built for lower bandwidth for less performance sensitive flows. Certain embodiments of a microcode sequencer do not solve the problem of needing more than three native width operands, and thus cross-lane instructions will not decompose efficiently and results in a long sequence of micro-operations to consolidate and merge various intermediate results. Certain embodiments of a microcode sequencer do not solve the problem of a writeback of the result requiring multiple native width micro-operations. Embodiments herein overcome these problems, for example, by breaking a single (e.g., cross-lane) instruction into a plurality of (e.g., only two) micro-operations without utilizing a microcode sequencer, e.g., and instead use the circuitry and schemes discussed herein.

Embodiments herein implement a single cross-lane instruction with a plurality of corresponding micro-operations without modifying a processor (e.g., core) (e.g., a reservation station) to monitor more than three input operands for a single micro-operation. In certain embodiments, a reservation station (e.g., circuit) supports only (e.g., tracking for their readiness for a data update) three native-width source registers, which is insufficient to support all the source data reads required to process all the elements at once for certain instructions. One solution is to use a separate initial helper micro-operation which simply reads data from specified logical registers and writes them to non-renamed internal registers (e.g., inside the execution circuit (e.g., execution unit)), with the main execution micro-operation depending on this helped micro-operation so that it always executes after it. For example, such that the main micro-operation can read three regular source operands (including the one from the dependency chain from the helper micro-operation) and two source operands from internal registers so that five source operands are available for execution. However, using internal non-renamed data within the execution circuit causes its own challenges, for example, once the helper micro-operation copies sources into non-renamed state within the execution circuit (e.g., unit), it must block other cross-lane helper micro-operations from overwriting them. Under certain conditions it may lead to a deadlock condition across two cross-lane instructions. For example, where the helper micro-operation from a younger cross-lane instruction may be ready first and block the execution circuit from being used by an older cross-lane micro-operation. However, if the main execution micro-operation from the younger cross-lane instruction depends on the result of the older cross-lane instruction, then it is also blocked in certain embodiments. To address this, in certain embodiments, an extra micro-operation is incorporated into the dependence chain of the helper micro-operation to ensure all five sources are ready before helper micro-operation can execute to guarantee forward progress of main execution micro-operation. A helper micro-operation and the extra micro-operations to prevent live lock further delay execution of the main micro-operation beyond the point when all the sources were ready. Such blocking of the execution circuitry affects latency and bandwidth in certain embodiments. This coupled with the increase in the number of actual operations can cause this sequence to again become a micro-coded flow to be output from a lookup in a microcode sequencer, further affecting latency and bandwidth. The writeback of the result requires multiple native width micro-operations in certain embodiments. In certain embodiments, tracker logic is required to track usage of non-renamed internal register(s) to block execution of helper micro-operation from other cross-lane instructions properly, and this tracker logic introduces a single cycle timing path in the reservation station (e.g., scheduler). Embodiments herein overcome these problems, for example, by implementing a single cross-lane instruction with a plurality of corresponding micro-operations without modifying a processor (e.g., core) (e.g., a reservation station thereof) to monitor more than three input operands for a single micro-operation, e.g., and instead use the circuitry and schemes discussed herein.

Embodiments herein are directed to circuitry to implement an ideal performant multiple (e.g., two) micro-operations support of (e.g., all) varieties of cross-lane (e.g., AVX2) instructions, e.g., in a half width data-path machine. This matches the theoretical minimal number of micro-operations required to support non-cross-lane instructions. As one example, refer to five logical native-width renamed operands used for execution of a cross-lane instruction as x1, x2, x3, x4, and x5 (for example, where each of x1-x5 is 128-bits wide and consist of the data from two or more of the instruction's operands that are 256-bits wide). In one embodiment, a processor (e.g., decoder circuit) is to, upon an input of a cross-lane packed data instruction from code to be processed, split the instruction into a first micro-operation and a second micro-operation. In one embodiment, the first micro-operation has three sources of x1, x2, and x3, such that a processor (e.g., reservation station entry) ensures that these three sources are ready for execution. In one embodiment, the first micro-operation does not do any computation except for copying one of the sources (e.g., one of x1, x2, or x3), or a modified version of it as desired, to a destination as a result, e.g., with the second micro-operation depending on the first micro-operation's result (e.g., x1) via one of its sources. In one embodiment, the other two sources of the second micro-operation (e.g., x4, and x5) correspond to the remaining logical native width renamed sources.

In certain embodiments, the second micro-operation has two implied sources (e.g., sources which are not tracked for readiness by a reservation station entry for the second micro-operation) which are populated upon insertion of the reservation station entry (e.g., for the second micro-operation) into the reservation station. In one embodiment, these are the physical addresses of the remaining sources from the first micro-operation (e.g., the other two of the x1, x2, or x3). In certain embodiments, these are not tracked by the reservation station for source readiness, which makes them resources inexpensive since these are not true 4th or 5th sources to the second micro-operation. Thus, in certain embodiments the second micro-operation depends on the first, and the second micro-operation will be dispatched by the reservation circuit only after the first micro-operation dispatches, e.g., implying that all 5 sources are ready when the second micro-operation dispatches.

In certain embodiments, a double pumped mechanism is utilized to read three sources (e.g., x4, x5 and x1 (where x1 is the resultant from the first micro-operation)) during the first pump of the second micro-operation and two remaining sources (e.g., x2 and x3 (where x1 is the resultant from the first micro-operation)) are read the next cycle during the second pump. In certain embodiments, all five sources of data required for execution are thus collected over two cycles for execution as an atomic wider bit width (e.g., 256-bit) operation on a narrower bit-width machine. In one embodiment, the first native width result broadcast and wake up of dependent operations happens during the first pump and the broadcast of the (e.g., high portion of the) native width result and wake up of dependent operations occurs during the second pump, e.g., one cycle later.

Thus, embodiments herein achieve theoretical minimal of two micro-operations for cross-lane micro-operation for best latency and bandwidth. Certain other solutions using non-renamed internal registers within execution circuits require three, four, or more micro-operations. Certain microcode solutions use three, four, or more micro-operations due to nature of cross-lane operation. Embodiments herein utilize a minimal number of micro-operations to avoid the performance impact of a microcode flow via a microcode sequencer.

Figure 3:
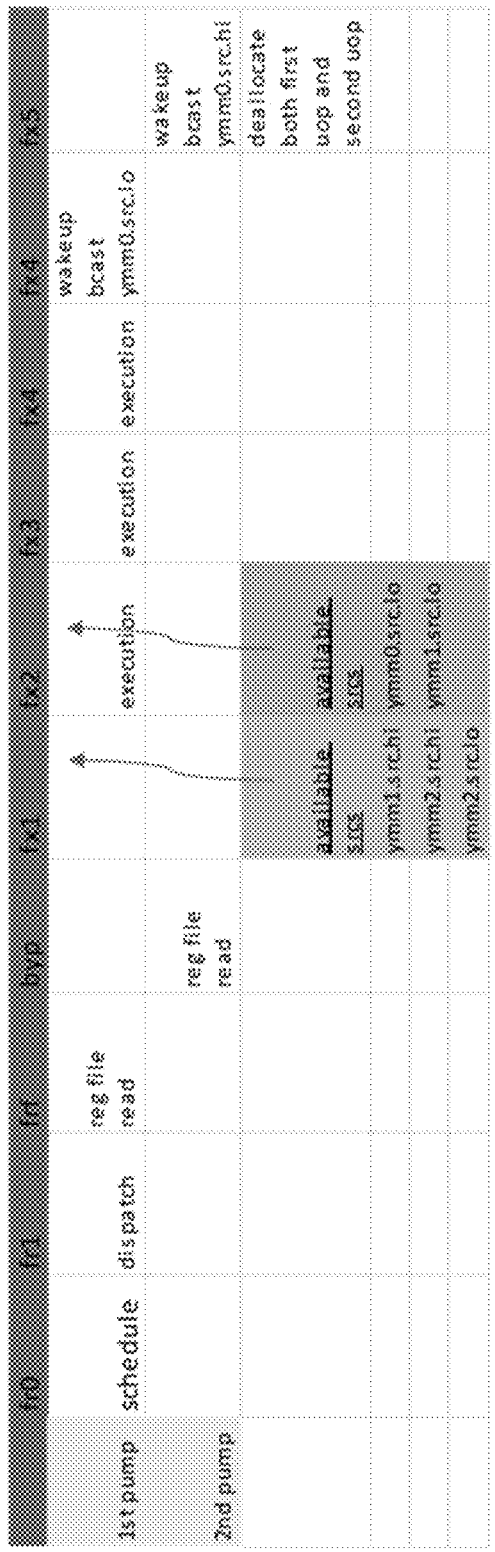
FIG. 3 illustrates an execution pipeline for a second micro-operation of a cross-lane packed data instruction according to embodiments of the disclosure.

Certain embodiments herein do not modify decode, allocation, reservation station occupancy, and/pr retirement bandwidth for a cross-lane instruction in contrast to the same for a non-cross-lane instruction. Certain embodiments herein are implemented as a two micro-operation sequence that is handled natively by cracking logic within a decoder circuit without using a microcode sequencer (e.g., without the performance penalty of using the microcode sequencer). Certain embodiments herein, from hardware cost standpoint, does not add any tracker hardware to track internal non-renaming register and single cycle timing path for blocking, e.g., there is no increase in number of sources tracked for each reservation station entry by a reservation station. Certain embodiments herein make minimal changes to reservation station and scheduler, e.g., as depicted in FIG. 3 hereof. Certain embodiments herein allow an existing scheduler and data-path for narrower bit-width operations to process wider bit-width cross-lane packed data instructions. For example, embodiments herein may be used to implement a wider ISA in a narrower (e.g., ½ width or ¼ width machine). For example, used to process a cross-lane instruction of a first bit (e.g., 512-bit) ISA on a narrower bit width (e.g., 256-bit) machine, or on an even narrower bit width (e.g., 128-bit) machine (e.g., using a quad-pump mechanism). Cross-lane instructions are expected to be more common and important as vector width grows wider. Possible use cases include cryptographic, compression, data movement, permute instructions. Cross-lane instructions may be used extensively in code vectorization for performance, and thus optimizing performance of cross-lane instructions is a significant benefit. Embodiments herein can be used to implement instructions requiring more source and destination operands than natively supported by a reservation station, e.g., for an operation which must execute atomically.

FIG. 1 illustrates a processor core 100 having circuitry (e.g., within allocation circuit 138, reservation station circuit 142, and/or execution circuits 140) for processing a cross-lane packed data instruction according to embodiments of the disclosure. The reservation station circuit may be a single reservation station circuit (for example, shared between the execution circuits 140, e.g., execution input ports 144, 146, and/or 148) or a plurality of reservation station circuits (for example, one reservation station circuit of a plurality of reservation station circuits for each of the execution circuits 140, e.g., for each of execution input ports 144, 146, and/or 148).

The plurality of execution circuits 140 may include a plurality of different types of execution circuits, for example, integer type of execution circuit(s), memory type of execution circuit(s), floating point type of execution circuit(s), packed data (e.g., single instruction, multiple data (SIMD) (e.g., vector)) type of execution circuit(s), or any combination thereof. Execution circuits 140 may include (i) a set of one or more integer type of execution circuits 150A, 150B, 150C, and 150D having corresponding integer ports 144 (labeled ports P0, P1, P2, and P3, respectively) (although shown as having four ports and four corresponding execution circuits of this type, any single or plurality may be utilized in certain embodiments), (ii) a set of one or more memory type of execution circuits 152A, 152B, and 152C, having corresponding memory ports 146 (labeled ports P4, P5, and P6, respectively) (although shown as having three ports and three corresponding execution circuits of this type, any single or plurality may be utilized in certain embodiments), and/or (iii) a set of one or more floating point type and/or SIMD type of execution circuits 154A, 154B, and 154C having corresponding floating point/SIMD ports 148 (labeled ports P7, P8, and P9, respectively) (although shown as having three ports and three corresponding execution circuits of this type, any single or plurality may be utilized in certain embodiments).

Operations to be executed (e.g., micro-operations from decoder circuits 120A-122A and/or decoder circuits 120B-122B) may be sent from allocation lanes 136 (for example, which may be any plurality, e.g., greater than the number of ports, equal to the number of ports, and/or less than the number or ports) to execution circuits 140 via ports 144, 146, and/or 148. In certain embodiments, the number of allocation lanes is referred to as the allocation width, e.g., the number of micro-operations which can be allocated (e.g., from instruction decode queue 124A and/or instruction decode queue 124B).

In certain embodiments, allocation circuit 138 is included to allocate the execution circuits 140 for the incoming micro-operations on allocation lanes 136. In certain embodiments, a reservation station circuit 142 is included to dispatch micro-operations when they are ready for execution, e.g., by sending the micro-operation on one or more issue (or dispatch) ports of the reservation station circuit 142 to a corresponding execution circuit of execution circuits 140. In one embodiment, a reservation station circuit 142 checks if the operand(s) for a micro-operation (e.g., as indicated in its reservation station entry) are available and if the corresponding execution circuit is available (e.g., free for use), and dispatches the micro-operation for execution in response to the operand(s) being available and the corresponding execution circuit being available. In certain embodiments, a processor utilizes register renaming to abstract a logical register from a physical register, e.g., with those logical register(s) utilized by reservation station (e.g., scheduler) circuit. Allocation circuit 138 may include a register alias table (RAT) 141, for example, to map an incoming logical register to a particular physical register 156.

Processor core 100 may be one of a plurality of cores of a processor, e.g., of a system. Processor core 100 may include a branch predictor 102 (e.g., to predict one or more branches of the code (e.g., instructions) that are to be executed by the processor core 100. In certain embodiments, the branch predictor 102 (e.g., branch predictor circuit)

learns from past behavior of branches to predict a next (e.g., incoming) branch. In certain embodiments, the branch predictor 102 predicts a proper subset of (e.g., contiguous in the original program order) instructions as a block of code (e.g., ending in a branch instruction). As one example, processor core 100 may receive code to execute and, in response, may divide the code into blocks.

In certain embodiments, the processor core 100 (e.g., via the fetch circuit 104 and/or branch predictor 102) may send the blocks of instructions to a decode cluster, for example, with a first block of instructions sent to decode cluster 0 108A, a (next in program order, e.g., younger) second block of instructions sent to decode cluster N 108B, etc. In a two-cluster example, a third (next in program order, e.g., younger) block of instructions may be sent to the next available decode cluster (e.g., after it has finished decode of its current block of instructions). In a two-cluster example, a third (next in program order, e.g., younger) block of instructions may be sent to the next decode cluster (e.g., to decoder cluster 108A in this example). Although two decode clusters 108A-108B are shown, it should be understood that three or more clusters may be utilized (e.g., where "N" is a positive integer greater than one).

In certain embodiments, each decode cluster includes two or more (e.g., superscalar x86) instruction decoders capable of decoding different basic blocks of code out-of-order with respect to each other, for example, with decode cluster 108A including a first decoder circuit 120A (e.g., decoder) and a second decoder circuit 122A (e.g., decoder), and decode cluster 108B including a second decoder circuit 120B (e.g., decoder) and a second decoder circuit 122B (e.g., decoder).

In certain embodiments, the branch predictor 102 of the processor core 100 divides code into individual blocks (e.g., of a set of contiguous instructions from the program). In certain embodiments, the fetch circuit 104 of the processor core 100 divides code into individual blocks (e.g., of a set of contiguous instructions from the program). The individual code blocks may then be sent to their respective decode cluster for decoding, for example, to a respective instruction data queue (e.g., instruction data queue 110A as an input queue for decode cluster 108A and instruction data queue 110B as an input queue for decode cluster 108B).

Optionally, processor core 100 includes a (e.g., level one) instruction cache 106, e.g., to cache one or more instructions without having to load them from memory. In certain embodiments, fetch circuit 104 sends code blocks to their respective decode cluster via instruction cache 106. Instruction cache 106 may include an instruction cache tag and/or instruction translation lookaside buffer (TLB). In certain embodiments, once the code blocks are sent to their corresponding decode cluster 108A-108B, each decode cluster begins decoding the code blocks in parallel (e.g., via the parallel decoder circuits therein). In certain embodiments, decode clusters operate independently of each other, so the blocks of code can be decoded out-of-order (e.g., out of program order).

In certain embodiments, the allocation circuit 138 is responsible for allocating the operations (e.g., micro-operations) to the execution circuits 140 (e.g., execution units), e.g., in the proper program order. The allocation circuit 138 may perform retirement and/or renaming, e.g., as well as including a re-order buffer (ROB) for reordering any out-of-order instruction (e.g., micro-operation) execution. In certain embodiments, processor core 100 includes a reservation station circuit 142 to cause a micro-operation to be sent (e.g., dispatched) to execution circuits 140 when that micro-operation is ready for execution, e.g., source operand(s) are available. In certain embodiments, reservation station circuit 142 includes a plurality of reservation station entries, e.g., one for each micro-operation awaiting execution.

Processor core depicts a first decode cluster 108A with a plurality of decoder circuits 120A-122A in a first set 112A and a second decode cluster 108B with a plurality of decoder circuits 120B-122B in a second set 112B. In certain embodiments, a (e.g., each) decoder circuit (120A, 122A, 120B, 122B) is to decode a (e.g., macro) instruction into a set of one or more micro-operations that are to be executed (e.g., as a primitive) by an execution circuit(s) 140. In certain embodiments, a decoder circuit (120A, 122A, 120B, 122B) is to decode certain (e.g., macro) instructions into a corresponding set of one or more micro-operations without utilizing a microcode sequencer 128 (e.g., a microcode sequencer separate from any decode cluster and/or decoder circuit) and/or decode other (e.g., macro) instructions (e.g., complex instruction set computer (CISC) instructions) into a corresponding set of one or more micro-operations by utilizing the microcode sequencer 128 (e.g., the microcode sequencer separate from any decode cluster and/or decoder circuit). In one embodiment, a decoder circuit (120A, 122A, 120B, 122B) is to output a certain number of micro-operation per cycle (e.g., one micro-operation per cycle and/or between one and four micro-operations per cycle). In certain embodiments, a "micro-coded" instruction generally refers to an instruction where a decode cluster (e.g., set of decoders) requests the microcode sequencer 128 to load the corresponding set of one or more (e.g., plurality of) micro-operations (μops) from the microcode sequencer memory 130 (e.g., read-only memory (ROM)) into the decode pipeline (e.g., into the corresponding instruction decode queue), e.g., instead of producing that instruction's set of one or more micro-operations directly by a decoder circuit. For example, to implement some (e.g., complex) (e.g., x86) instructions, a microcode sequencer 128 is used to divide the instruction into a sequence of smaller (e.g., micro) operations (also referred to as micro-ops or μops).

In certain embodiments, each decode cluster (e.g., each decoder circuit in some embodiments) includes a data structure to store a corresponding entry point value (e.g., address) for one or more instructions into memory 130 of microcode sequencer 128 and/or a number of bits (e.g., the number of cycles to generate the corresponding micro-operations for an instruction and/or the number of micro-operations for the instruction). For example, (1) with data structure 114A of decode cluster 108A including one or more entries that each indicate (e.g., for a single instruction), an entry point 116A for an instruction and/or bits (e.g., a coded value) for the instruction and/or (2) with data structure 114B of decode cluster 108B including one or more entries that each indicate (e.g., for a single instruction), an entry point 116B for an instruction and/or bits (e.g., code) for the instruction. In certain embodiments, data structure 114A and data structure 114B are copies of each other, e.g., they include the same data. In one embodiment, data structure 114A and data structure 114B are loaded with their data at manufacturing time. In one embodiment, data structure 114A and data structure 114B are loaded with their data during processor boot, e.g., by executing Basic Input/Output System (BIOS) firmware or Unified Extensible Firmware Interface (UEFI) firmware.

After decoding of an instruction into its respective micro-operations (e.g., by decoder circuits or microcode sequencer), in certain embodiments they are stored in an instruction decode queue. In FIG. 1 (e.g., at the end of the decode stage), decode cluster 108A includes instruction decode queue 124A (e.g., instruction queue) that receives respective micro-operations from decoder circuits 120A-122A and from microcode sequencer 128 (e.g., when decode cluster 108A is arbitrated access to memory 130) and decode cluster 108B includes instruction decode queue 124B (e.g., instruction queue) that receives respective micro-operations from decoder circuits 120B-122B and from microcode sequencer 128 (e.g., when decode cluster 108B is arbitrated access to memory 130).

Optionally, switch 134 is included to couple output(s) of instruction decode queues 124A-124B to allocation lanes 136 (e.g., input(s)) of allocation circuit 138. In certain embodiments, allocation circuit 138 is to send micro-operations from the instruction decode queues 124A-124B (e.g., in or out of program order) to an execution circuit of execution circuits 140 (e.g., via reservation station circuit 142). In certain embodiments, processor core 100 includes a reservation station circuit 142 to cause a micro-operation to be sent (e.g., dispatched) to execution circuits 140 when that micro-operation is ready for execution, e.g., source operand(s) are available. In certain embodiments, reservation station circuit 142 includes a plurality of reservation station entries, e.g., one for each micro-operation awaiting execution.

Certain execution circuits 140 (e.g., memory execution circuits 150A-154C) may access storage, e.g., registers 156 and/or data cache 162 (e.g., one or more levels of a cache hierarchy). Once the resultants are generated by the execution circuits 140, a retirement circuit (e.g., within allocation circuit 138) may then retire a corresponding instruction.

In certain embodiments, registers 156 includes data register(s) 158, e.g., one or more packed data registers 160.

As one example, a request to execute an instruction having a first width (e.g., 256 bits wide) is received by processor core 100 that has a narrower (e.g., data-path) width (e.g., 128 bits wide) and is sent to decoder circuit (e.g., decoder circuit 120A-122A or 120B-122B). In certain embodiments, it is determined (e.g., by decoder circuit in response to the opcode for the instruction) that the instruction is a cross-lane packed data instruction, and the core 100 (e.g., decoder circuit thereof) is then to break the instruction into a first micro-operation and a second micro-operation. For example, if the instruction includes a first width (e.g., 256 bits) of input operands 1, 2, and 3 (e.g., half of 3), the core 100 loads that data into five different native width packed data registers 160 which may be referred to as x1-x5. In certain embodiments, the first micro-operation (e.g., to be stored into a reservation station entry in reservation station circuit 142) has three sources of x1, x2, and x3, such that reservation station entry ensures that these three sources are ready for execution before dispatching the first micro-operation to a packed data execution circuit 154A-154C. In one embodiment, the first micro-operation copies one of the sources (e.g., one of x1, x2, or x3) to a destination as a result, e.g., with the second micro-operation depending on the first micro-operation's result (e.g., x1) via one of its sources. In one embodiment, the other two sources of the second micro-operation (e.g., x4, and x5) correspond to the remaining logical native width renamed sources. Thus, in certain embodiments, after execution of the first micro-operation, the second micro-operation has three sources with one including the copy of the one source (e.g., the one of x1, x2, or x3), such that reservation station entry ensures that these three sources are ready for execution before dispatching the second micro-operation to a packed data execution circuit 154A-154C, e.g., and that execution circuit is to load all of x1-x5 therein for execution. After execution, the reservation station entries for both the first and the second micro-operations can be deallocated, e.g., by reservation station circuit 142.

Figure 2:
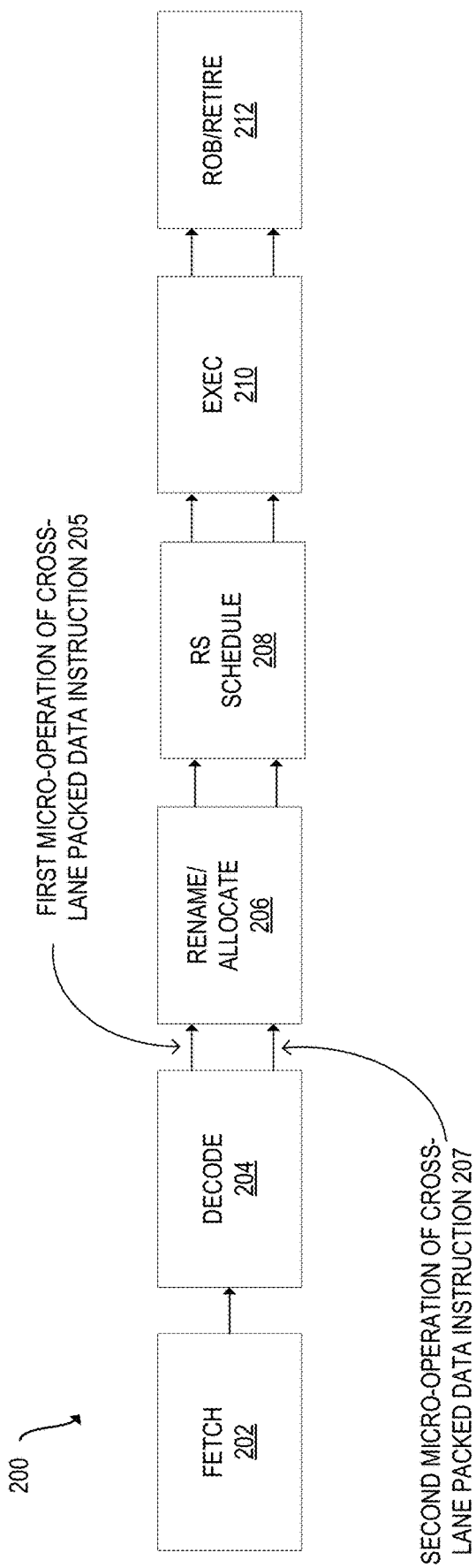
FIG. 2 illustrates the processing of a cross-lane packed data instruction by a processor core pipeline including decoding the cross-lane packed data instruction into a first micro-operation and a second micro-operation according to embodiments of the disclosure.

FIG. 2 illustrates the processing of a cross-lane packed data instruction by a processor core pipeline including decoding the cross-lane packed data instruction into a first micro-operation and a second micro-operation according to embodiments of the disclosure. In certain embodiments, pipeline 200 includes a fetch 202 stage to fetch an instruction, a decode 204 stage to decode a fetched instruction into as set of one or more micro-operations for execution to perform the requested operation(s) of the instruction, a rename/allocate 206 stage to rename/allocate resources, a reservation station (RS) schedule 208 stage (e.g., to monitor operand(s) and dispatch a corresponding micro-operation for execution when the operands are ready), an execution 210 stage to execute the micro-operation, and a ROB/retire 212 stage for reordering/retirement of the micro-operation.

In one embodiment, pipeline 200 receives a cross-lane packed data instruction, and in response, divides the instruction into a first micro-operation 205 and a second micro-operation 207.

Although certain examples herein discuss splitting multiple logical sources (e.g., input operands of an instruction) into five vectors of native width, it should be understood that other numbers are possible, e.g., splitting three logical sources into six vectors of native width. For example, one cross-lane packed data instruction has three input operands that are each capable of having up to a first bit width (e.g., 256 bits wide) and the machine to process that instruction has a smaller, native bit width (e.g., 128 bits wide).

An example of such an instruction format is:
INST ymm0, ymm1, ymm2
Where INST is the mnemonic for the opcode, ymm0 is source 1 and destination, ymm1 and ymm2 are source 2 and source 3 respectively and are each 256 bits wide.

In one embodiment of a half width machine (and assuming in this example, only the lower 128-bits of ymm0 is used as source although the entire width can be used in other embodiments as is discussed herein), this INST instruction can be represented in the machine as an instruction with five 128-bit source registers and two 128-bit destination registers, for example:
{ymm0.dst.hi, ymm0.dst.lo}<-INST ymm0.src.lo, ymm1.src.lo, ymm2.src.lo, ymm1.src.hi, ymm2.src.hi
Where dst is destination, src is source, lo is the lower half of a register, and hi is the higher half of a register.

In certain embodiments, the cross-lane instruction is cracked into two micro-operations:
First Micro-Operation of the Pair:
ymm0.dst.lo<-FIRST_MOVE_UOP ymm0.src.lo, ymm1.src.lo, ymm2.src.lo
Where this micro-operation is to copy ymm2.src.lo to ymm0.dst.lo. Although ymm0.dst.low is used to store the copy of the data from ymm2.src.lo in this example, it should be understood that a different (e.g., temporary) register can be utilized in other embodiments.
Second Micro-Operation of the Pair:
{ymm0.dst.hi, ymm0.dst.lo}<-SECOND_CL_UOP ymm1.src.hi, ymm2.src.hi, ymm0.dst.lo
Where implied sources are ymm0.src.lo and ymm1.src.lo, ymm.src and ymm.dst is a different renamed copy of same logical register, and lo and hi represent lower and higher 128-bit of a register, respectively. The operation performed by the second micro-operation may be any packed data operation, e.g., cryptographic (e.g. Secure Hash Algorithm (SHA), such as, but not limited to, SHA-256 or SHA-512), permute, shuffle, convert, broadcast, compress, or insert operations.

Figure 4:
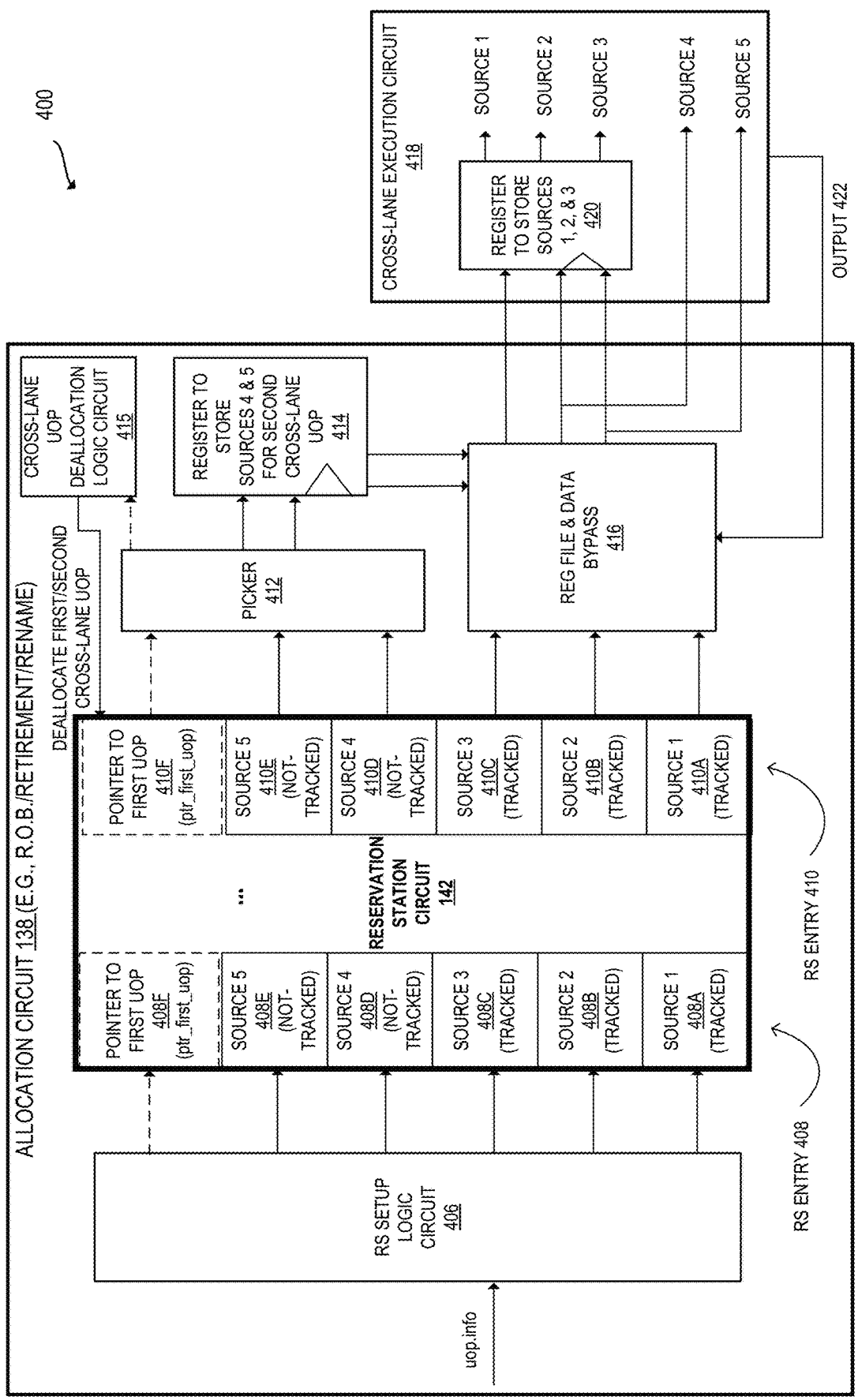
FIG. 4 illustrates circuitry for processing a cross-lane packed data instruction according to embodiments of the disclosure.

In certain embodiments, the purpose of first micro-operation (e.g., FIRST_MOVE_UOP) is to setup dependence on 3 of 5 sources, for example, such that the first micro-operation cannot execute until its three sources are ready. In one embodiment, FIRST_MOVE_UOP copies one of the sources register (ymm2.src.lo) to destination logical register. Since second micro-operation SECOND_CL_UOP depends on first micro-operation, it may only execute after all 5 sources are ready in certain embodiments. In certain embodiments, native hardware supports reading up to 3 source operands for a single micro-operation. Therefore SECOND_CL_UOP reads ymm1.src.hi, ymm2.src.hi and ymm2.src.lo (e.g., via ymm0.dst.lo where it was copied by the first micro-operation) from register file or bypass network (e.g., as shown in FIG. 4). In certain embodiments, SECOND_CL_UOP writes back a single 128-bit result to register file and bypass network.

In certain embodiments, to support SECOND_CL_UOP's requirement to read five source registers and write back to two destination registers, a processor (e.g., core) implements a double-pumping mechanism.

FIG. 3 illustrates an execution pipeline 300 for a second micro-operation of a cross-lane packed data instruction according to embodiments of the disclosure. Note that the data indicated as ymm2.src.lo in FIG. 3 is to indicate that is the original source of the data, but the monitoring (and current source) of that data is the location it was copied to, e.g., in the above example ymm2.src.lo was copied to ymm0.dst.lo so ymm0.dst.lo is the entry with the reservation station.

Using the above example, SECOND_CL_UOP uses dispatch port, execution circuit, broadcast coupling (e.g., interconnect/buses), and result write back coupling (e.g., interconnect/buses) for two consecutive cycles in certain embodiments. In one embodiment, during the first dispatch cycle from a reservation station, the second micro-operation is dispatched down execution pipeline and reads its three tracked source operands indicated by the reservation station entry, e.g., and during the next cycle, register file (or data bypass) is used again to read two implied (e.g., not-tracked for readiness by that reservation station entry) source operands ymm0.src.lo and ymm1.src.lo. Thus, in certain embodiments, at the second execution cycle, execution gets all 5 source operands, e.g., and the SECOND_CL_UOP then computes 256-bit results from entire full width 256-bit operation atomically with the result written into two 128-bit logic registers. In certain embodiments, since the execution pipeline (e.g., of an execution circuit) is reserved for two consecutive cycles, the reservation station circuit can broadcast wakeup to dependent micro-operations in reservation station, as well as write-back result for ymm0.dst.lo and ymm0.dst.hi, e.g., over two back-to-back cycles. For example, with low half 128-bit result broadcast and wake up its dependent micro-operations in a first cycle, and one cycle later, high half 128-bit result broadcasts and wake up its dependent micro-operations. This mechanism can be implemented in a scheduler and data-path designed for half-width 128-bit operation. In certain embodiments, since all sources can be obtained and executed as a single operation, this is suitable to all varieties of cross-lane 256-bit operation without restriction.

As the SECOND_CL_UOP computes both low 128-bit and high 128-bit result atomically, embodiments herein reuse ymm0.dst.lo registers as a temporary register to pass one of the sources from first micro-operation to the second micro-operation, e.g., and reuse source operand encoding ymm0.dst.lo (e.g., which has the data values copied from ymm0.src.lo) from second micro-operation as destination register for writeback. This avoids adding dedicated storage encoding for second writeback physical register.

FIG. 4 illustrates circuitry 400 for processing a cross-lane packed data instruction according to embodiments of the disclosure. Circuitry 400 may be part of processor core 100, or other apparatuses discussed herein. Although certain components are shown within other components, those are examples and other configurations are possible. For example, although the register 414 is shown in allocation circuit 138, it may be elsewhere, e.g., within cross-lane execution circuit 418. Cross-lane execution circuit 418 may be an instance of execution circuit of execution circuits 154A-154C in FIG. 1, e.g., having a plurality of processing elements to (e.g., simultaneously) operate on multiple data elements.

In certain embodiments, allocation circuit 138 is to cause a micro-operation to be stored in reservation circuit 142 that includes tracked data sources and one or more (e.g., not-tracked) additional data sources. In one embodiment, allocation circuit 138 is to send (e.g., a "second cross-lane μop" (SECOND_CL_UOP)) micro-operation to reservation circuit 138 in response to detecting (e.g., via an identifier thereof) that an (e.g., second micro-operation of a cross-lane) instruction is to include one or more (e.g., not-tracked) additional data sources. In certain embodiments, allocation circuit is to send micro-operation information (uop.info) to reservation station (RS) setup logic circuit 406 to setup each entry, e.g., and populate one or more fields of each entry.

For example, with reservation station (RS) entry 408 for a (e.g., second micro-operation of a pair of micro-operations corresponding to a cross-lane packed data instruction, including a first field 408A storing a value (e.g., physical register ID value (psrc1_id)) that indicates a location of a first source data operand that is tracked for readiness (e.g., the data there from is available to be used for execution), a second field 408B storing a value (e.g., physical register ID value (psrc2_id)) that indicates a location of a second source data operand that is tracked for readiness (e.g., the data there from is available to be used for execution), a third field 408C storing a value (e.g., physical register ID value (psrc3_id)) that indicates a location of a third source data operand that is tracked for readiness (e.g., the data there from is available to be used for execution), and then including one or more of: a fourth field 408D storing a value (e.g., physical register ID value (psrc4_id)) that indicates a location of a fourth source data operand that is not tracked for readiness (e.g., from register(s) 414), a fifth field 408E storing a value (e.g., physical register ID value (psrc5_id)) that indicates a location of a fifth source data operand that is not tracked for readiness (e.g., from register(s) 414), or a sixth field 408F storing a value (e.g., ptr_first_uop) that indicates a pointer (e.g., location or an entry number of a RS entry) to the RS entry (e.g., entry 410) for the first micro-operation of that pair of micro-operations corresponding to the cross-lane packed data instruction.

For example, with reservation station (RS) entry 410 for a (e.g., second micro-operation of a pair of micro-operations corresponding to a cross-lane packed data instruction, including a first field 410A storing a value (e.g., physical register ID value (psrc1_id)) that indicates a location of a first source data operand that is tracked for readiness (e.g., the data there from is available to be used for execution), a second field 410B storing a value (e.g., physical register ID value (psrc2_id)) that indicates a location of a second source data operand that is tracked for readiness (e.g., the data there from is available to be used for execution), a third field 410C storing a value (e.g., physical register ID value (psrc3_id)) that indicates a location of a third source data operand that is tracked for readiness (e.g., the data there from is available to be used for execution), and then including one or more of: a fourth field 410D storing a value (e.g., physical register ID value (psrc4_id)) that indicates a location of a fourth source data operand that is not tracked for readiness (e.g., from register(s) 414), a fifth field 410E storing a value (e.g., physical register ID value (psrc5_id)) that indicates a location of a fifth source data operand that is not tracked for readiness (e.g., from register(s) 414), or a sixth field 410F storing a value (e.g., ptr_first_uop) that indicates a pointer (e.g., location or an entry number of a RS entry) to the RS entry (e.g., entry 408) for the first micro-operation of that pair of micro-operations corresponding to the cross-lane packed data instruction. In certain embodiments, cross-lane micro-operation (uop) deallocation logic circuit 415 inputs "pointer to first micro-operation" (e.g., the dotted arrow) to generate a deallocation indication (e.g., the signal coming out from the top of circuit 415 in FIG. 4) for that pair of first and second micro-operations in response to the cross-lane second micro-operation's pick/dispatch if the second micro-operation completes successfully (e.g., no cancellation due to bad load data, etc.).

In certain embodiments, the .info indicates where the sources (e.g., physical source register id(s)) (psrc_id(s)), the destination physical register id(s) (pdst_id(s)), opcode, port binding information, etc.)

In certain embodiments (e.g., for populated active entries), reservation station circuit 142 monitors the indicated operands, etc., and then dispatches (e.g., via picker 412) a micro-operation once it is ready for execution (e.g., once its operands are available).

For example, if the instruction includes a first width (e.g., 256 bits) of input operands 1, 2, and 3 (e.g., half of 3) and the core (e.g., core 100 in FIG. 1) has loaded that data into five different native width packed data registers (e.g., registers 160 in FIG. 1) which may be referred to as x1-x5. In certain embodiments, the first micro-operation's reservation station entry (e.g., entry 408) in reservation station circuit 142 has the first micro-operation's three sources of x3, x4, and x5 set into source 1 field 408A, source 2 field 408B, and source 3 field 408C (respectively), e.g., with the other fields therein not utilized, such that reservation station entry ensures that these three sources are ready for execution before dispatching the first micro-operation to a packed data execution circuit 154A-154C (which may be cross-lane execution circuit 418 or a non-cross-lane execution circuit, e.g., by picker 412. In one embodiment, the first micro-operation copies one of the sources (e.g., one of x3, x4, or x5) to a destination (dest) as a result, e.g., with the second micro-operation depending on the first micro-operation's result (e.g., x3) via one of its sources. In certain of such embodiments (e.g., before the execution of the first micro-operation), the second micro-operation's reservation station entry (e.g., entry 410) in reservation station circuit 142 has the second micro-operation's three sources of dest of the first micro-operation (e.g., storing a value of the one of x3, x4, or x5), x1, and x2 set into source 1 field 410A, source 2 field 410B, and source 3 field 410C, e.g., with the other fields therein utilized such that the non-copied first source (e.g., a non-copied one of x3, x4, or x5) (e.g., x4 in FIG. 4) is set into source 4 field 410D, the non-copied second source (e.g., the other non-copied one of x3, x4, or x5) (e.g., x5 in FIG. 4) is set into source 5 field 410E, and (optionally) a pointer to the entry (e.g., entry 408) for the first micro-operation of that pair of micro-operations corresponding to the cross-lane packed data instruction is set into field 410F. In certain embodiments, such a reservation station entry 410 implicitly ensures that these five source (although only explicitly checking three sources for readiness) are ready for execution before dispatching the second micro-operation to cross-lane execution circuit 418, e.g., by picker 412.

In one embodiment, register(s) 414 are loaded with the physical source register id (psrc_id) of non-copied first source (e.g., a non-copied one of x3, x4, or x5) (e.g., x4 in FIG. 4) and the physical source register id (psrc_id) of non-copied second source (e.g., the other non-copied one of x3, x4, or x5) (e.g., x5 in FIG. 4) in response to certain (e.g., other) micro-operations performing their operation(s). In one embodiment, register(s) 414 are loaded with the non-copied first source (e.g., a non-copied one of x3, x4, or x5) (e.g., x4 in FIG. 4) and the non-copied second source (e.g., the other non-copied one of x3, x4, or x5) (e.g., x5 in FIG. 4) in response to dispatch of the second micro-operation by the picker 412. In certain embodiments, register(s) 414 are separate from the general physical registers used by a core.

In certain embodiments, picker 412 dispatching a second micro-operation from entry 410 populated in the above example for execution causes the three sources (e.g., x3 (via dest from the above example), x2, and x1) that are explicitly indicated as "ready" to be loaded from register file and data bypass 416 into a register(s) 420 (e.g., within cross-lane execution circuit 418), and (e.g., one cycle later) causes the other two sources (e.g., x4 and x5) to be loaded from register file and data bypass 416 using register(s) 414 which has physical source register id (psrc_id) of non-copied first and second source, and a resultant output 422 to be generated therefrom. Output 422 may be two different writes, e.g., where the resultant from the operation by the cross-lane execution circuit 418 is wider than the native width of the hardware.

After execution, the reservation station entries for both the first and the second micro-operations can be deallocated, e.g., by allocation circuit 138. For example, where the pointer 410F to the first micro-operation is used to deallocate the first micro-operation in response to an indication to deallocate the second micro-operation of that pair. In one embodiment, the deallocation indication is sent in response to a successful dispatch and completion of the second micro-operation.

Certain embodiments herein add a field(s) for a source four and a source 5 (e.g., physical register source ID (psrcid) field to one or more entries in a reservation station. Certain embodiments herein do not change the number (e.g., 3) of sources tracked by reservation station, e.g., sources 4 and 5 are storage fields only and are not tracked by the reservation station. In certain embodiments, e.g., during allocation, ymm0.src.lo and ymm1.src.lo from allocation lane of first micro-operation are inserted into field(s) for implied source 4 and source 5 physical register source ID (psrcid) in reservation station entry of second micro-operation. In certain embodiments, circuitry (e.g., multiplexer) is added to insert source 4 and source 5 psrcid to address input of register file read port (e.g., register file 416). Certain embodiments herein include control logic circuitry to compute bypass control for source 4 and source 5, e.g., implemented by copying from bypass control signal of first piece micro-operation in flight if it is one or two cycles ahead (e.g., depending on actual design). In one embodiment, e.g., if it is more than 2 cycle ahead, can read this data from register file (e.g., from register file 416). Certain embodiments herein suppress deallocation of entry for first micro-operation of a pair from reservation station when the first micro-operation completes execution. In certain embodiments, the second micro-operation of the pair is responsible to deallocation of both first micro-operation and second micro-operation. For example, where the first micro-operation does not compute the final result for ymm0.dst.lo, and the second micro-operation writes ymm0.dst.lo with the final result. To a certain allocation circuit 138, deallocation of first micro-operation implies ymm0.dst.lo is ready, which is not true in this example since the final result in computed by second micro-operation, and thus a new field (e.g., field 408F and field 410F) in reservation station 142 is used to store a pointer to reservation entry of first micro-operation in certain embodiments.

Embodiments herein thus allow implementation of wider cross-lane instructions with a minimal number of narrower micro-operations (e.g., two micro-operations). Disclosure herein can be expanded to support operation requiring six or more operands, e.g., by cascading dependence via more than one micro-operation to setup dependence to main execution micro-operation. For example, embodiments herein support a 512 bit wide cross-lane instruction on a ¼ width 128-bit data-path machine. For example, embodiments herein support an instruction requiring more source operands than number of operands supported by reservation station. For example, embodiments herein support a dual destination instruction.

For example, embodiments herein implement a cross-lane instruction (e.g., any of VPERM2I128, VPERM2F128, VPTEST, VPERMD, or VPERMQ) in only two micro-operations, e.g., in contrast to implementing them in 3 or more micro-operations, for example, implementing VPERM2I128 in eight micro-operations and implementing VPERM2F128 in eight micro-operations, and others in three micro-operations.

FIG. 5 is a flow diagram illustrating operations 500 for processing a cross-lane packed data instruction according to embodiments of the disclosure. Some or all of the operations 500 (or other processes described herein, or variations, and/or combinations thereof) are performed under the control of an allocation circuit, reservation station circuit, and/or cross-lane execution circuit.

The operations 500 include, at block 502, decoding a single packed data instruction into only a first micro-operation and a second micro-operation with a decoder circuit of a processor comprising a reservation station circuit coupled between the decoder circuit and a packed data execution circuit. The operations 500 further include, at block 504, allocating a first reservation station entry in the reservation station circuit for the first micro-operation having a first set of fields that indicate three or more input sources and a first destination. The operations 500 further include, at block 506, allocating a second reservation station entry in the reservation station circuit for the second micro-operation having a second set of fields that indicate three or more input sources and a second destination. The operations 500 further include, at block 508, executing the first micro-operation and the second micro-operation from the reservation station circuit with the packed data execution circuit of the processor. In one embodiment, the second micro-operation from the reservation station executes in a cross-lane execution circuit (e.g., cross-lane execution circuit 418 in FIG. 4), e.g., in a packed data execution circuit of the processor Exemplary architectures, systems, etc. that the above may be used in are detailed below.

At least some embodiments of the disclosed technologies can be described in view of the following examples:

Example 1. An apparatus comprising:
a decoder circuit to decode a single packed data instruction into only a first micro-operation and a second micro-operation;
a packed data execution circuit to execute the first micro-operation and the second micro-operation; and
a reservation station circuit coupled between the decoder circuit and the packed data execution circuit, the reservation station circuit comprising a first reservation station entry for the first micro-operation to store a first set of fields that indicate three or more input sources and a first destination, and a second reservation station entry for the second micro-operation to store a second set of fields to indicate three or more input sources and a second destination.

Example 2. The apparatus of example 1, wherein the single packed data instruction comprises a first source register, a second source register, and a third source register that are each wider than a data-path width of the packed data execution circuit, the three or more input sources of the first micro-operation, and the three or more input sources of the second micro-operation.

Example 3. The apparatus of example 1, wherein the reservation station circuit is to dispatch the first micro-operation for execution by the packed data execution circuit in response to all of the three or more input sources of the first micro-operation being ready for execution.

Example 4. The apparatus of example 3, wherein execution of the first micro-operation copies at least one of the three or more input sources to the first destination.

Example 5. The apparatus of example 4, wherein one of the three or more input sources of the second micro-operation comprises the first destination, and the reservation station circuit is to dispatch the second micro-operation for execution by the packed data execution circuit (e.g., a cross-lane execution circuit in some embodiments) in response to all of the three or more input sources of the second micro-operation being ready for execution.

Example 6. The apparatus of example 1, wherein execution of the second micro-operation performs an operation on packed data values from two of the three or more input sources of the first micro-operation and packed data values from the three or more input sources of the second micro-operation.

Example 7. The apparatus of example 6, wherein the second reservation station entry for the second micro-operation is to store the second set of fields to further indicate one or more registers storing the two of the three or more input sources of the first micro-operation, and the reservation station circuit is not to track the one or more registers to determine if the two of the three or more input sources of the first micro-operation are ready for execution.

Example 8. The apparatus of example 1, wherein the second reservation station entry for the second micro-operation is to store the second set of fields that further indicate a pointer to the first reservation station entry, and the reservation station circuit is to deallocate both the first reservation station entry for the first micro-operation and the second reservation station entry for the second micro-operation in response to execution of the second micro-operation.

Example 9. A method comprising:
decoding a single packed data instruction into only a first micro-operation and a second micro-operation with a decoder circuit of a processor comprising a reservation station circuit coupled between the decoder circuit and a packed data execution circuit;
allocating a first reservation station entry in the reservation station circuit for the first micro-operation having a first set of fields that indicate three or more input sources and a first destination;
allocating a second reservation station entry in the reservation station circuit for the second micro-operation having a second set of fields that indicate three or more input sources and a second destination; and
executing the first micro-operation from the reservation station circuit with the packed data execution circuit of the processor and the second micro-operation from the reservation station circuit with the packed data execution circuit (e.g., a cross-lane execution circuit in some embodiments).

Example 10. The method of example 9, wherein the single packed data instruction comprises a first source register, a second source register, and a third source register that are each wider than a data-path width of the packed data execution circuit, the three or more input sources of the first micro-operation, and the three or more input sources of the second micro-operation.

Example 11. The method of example 9, further comprising dispatching the first micro-operation by the reservation station circuit for execution by the packed data execution circuit in response to all of the three or more input sources of the first micro-operation being ready for execution.

Example 12. The method of example 11, wherein the executing of the first micro-operation copies at least one of the three or more input sources to the first destination.

Example 13. The method of example 12, wherein one of the three or more input sources of the second micro-operation comprises the first destination, and further comprising dispatching the second micro-operation by the reservation station circuit for execution by the packed data execution circuit (e.g., a cross-lane execution circuit in some embodiments) in response to all of the three or more input sources of the second micro-operation being ready for execution.

Example 14. The method of example 9, wherein the executing of the second micro-operation performs an operation on packed data values from two of the three or more input sources of the first micro-operation and packed data values from the three or more input sources of the second micro-operation.

Example 15. The method of example 14, wherein the second set of fields further indicates one or more registers storing the two of the three or more input sources of the first micro-operation, and further comprising not tracking the one or more registers by the reservation station circuit to determine if the two of the three or more input sources of the first micro-operation are ready for execution.

Example 16. The method of example 9, wherein the second set of fields further indicates a pointer to the first reservation station entry, and further comprising deallocating both the first reservation station entry for the first micro-operation and the second reservation station entry for the second micro-operation by the reservation station circuit in response to execution of the second micro-operation.

Example 17. An apparatus comprising:
a decoder circuit to decode a single packed data instruction into only a first micro-operation and a second micro-operation;
a first packed data execution circuit to execute the first micro-operation;
a second packed data execution circuit to execute the second micro-operation; and
a reservation station circuit coupled between the decoder circuit and the first packed data execution circuit and the second packed data execution circuit, the reservation station circuit comprising a first reservation station entry for the first micro-operation to store a first set of fields that indicate three or more input sources and a first destination, and a second reservation station entry for the second micro-operation to store a second set of fields to indicate three or more input sources and a second destination.

Example 18. The apparatus of example 17, wherein the single packed data instruction comprises a first source register, a second source register, and a third source register that are each wider than a data-path width of the first packed data execution circuit and the second packed data execution circuit, the three or more input sources of the first micro-operation, and the three or more input sources of the second micro-operation.

Example 19. The apparatus of example 17, wherein the reservation station circuit is to dispatch the first micro-operation for execution by the first packed data execution circuit in response to all of the three or more input sources of the first micro-operation being ready for execution.

Example 20. The apparatus of example 19, wherein execution of the first micro-operation copies at least one of the three or more input sources to the first destination.

Example 21. The apparatus of example 20, wherein one of the three or more input sources of the second micro-operation comprises the first destination, and the reservation station circuit is to dispatch the second micro-operation for execution by the second packed data execution circuit in response to all of the three or more input sources of the second micro-operation being ready for execution.

Example 22. The apparatus of example 17, wherein execution of the second micro-operation performs an operation on packed data values from two of the three or more input sources of the first micro-operation and packed data values from the three or more input sources of the second micro-operation.

Example 23. The apparatus of example 22, wherein the second reservation station entry for the second micro-operation is to store the second set of fields to further indicate one or more registers storing the two of the three or more input sources of the first micro-operation, and the reservation station circuit is not to track the one or more registers to determine if the two of the three or more input sources of the first micro-operation are ready for execution.

Example 24. The apparatus of example 17, wherein the second reservation station entry for the second micro-operation is to store the second set of fields that further indicate a pointer to the first reservation station entry, and the reservation station circuit is to deallocate both the first reservation station entry for the first micro-operation and the second reservation station entry for the second micro-operation in response to execution of the second micro-operation.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
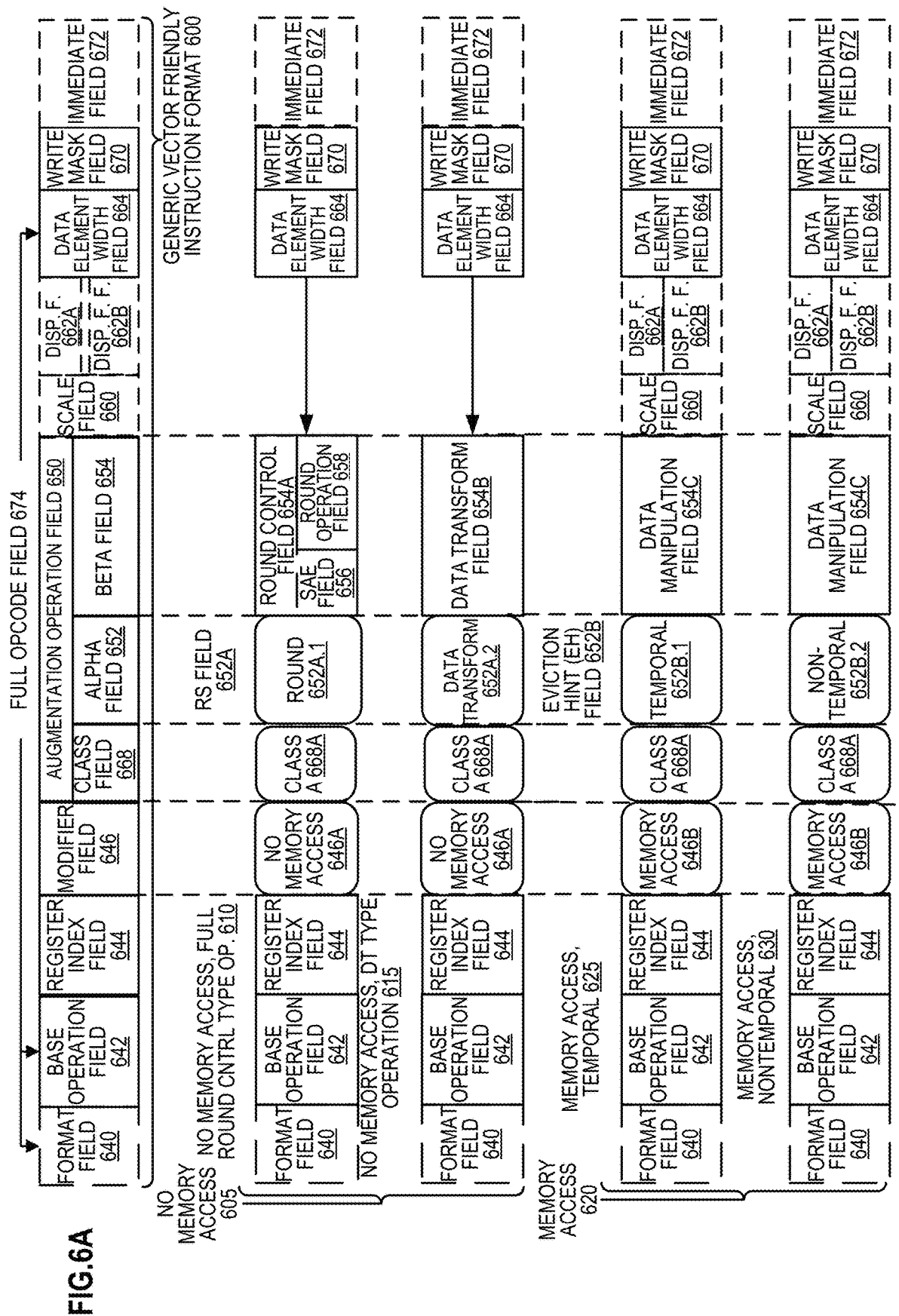
FIG. 6A is a block diagram illustrating a generic vector friendly instruction format and class A instruction templates thereof according to embodiments of the disclosure.
Figure 6B:
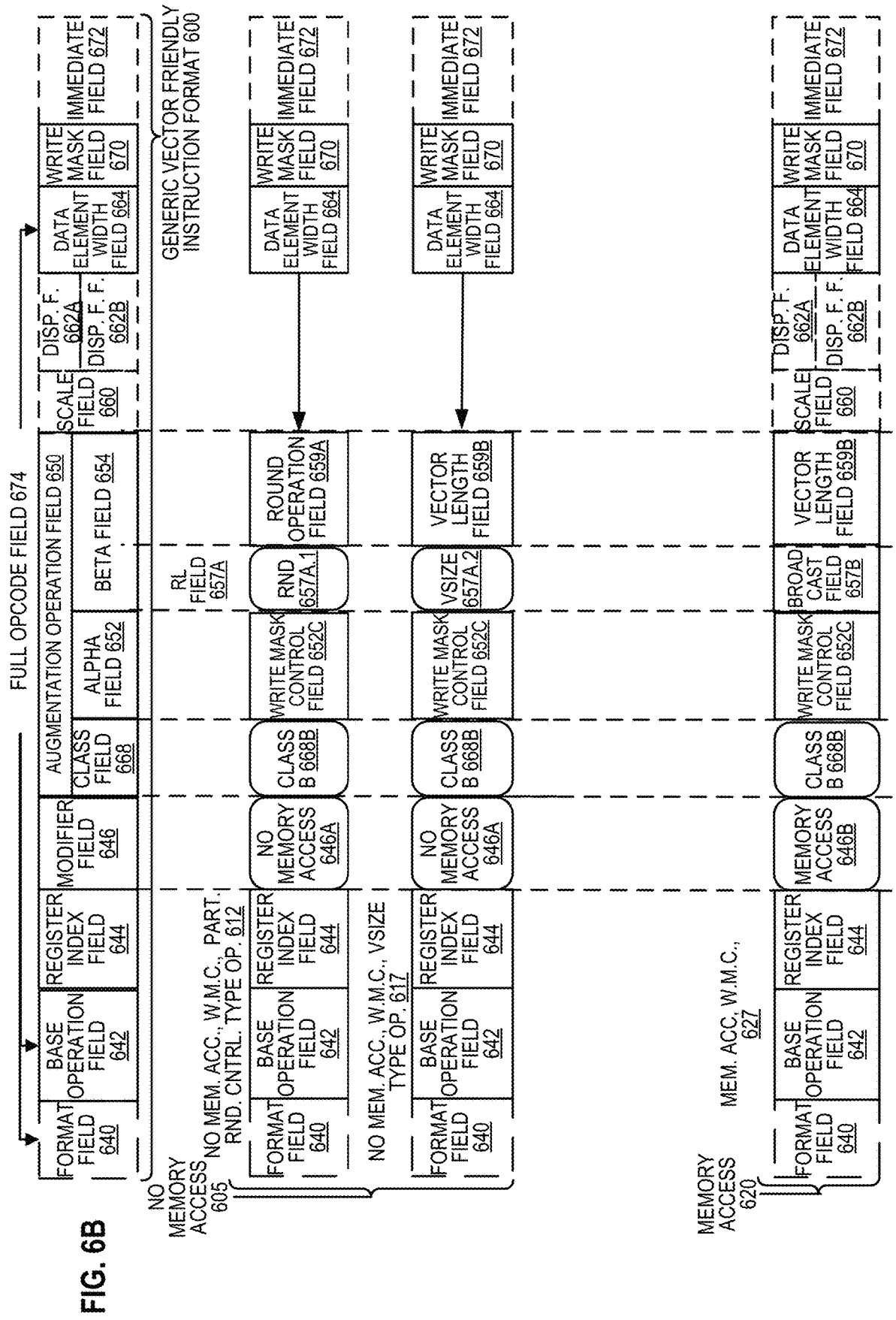
FIG. 6B is a block diagram illustrating the generic vector friendly instruction format and class B instruction templates thereof according to embodiments of the disclosure.

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}$*index+base).

Displacement Field 662A—its content is used as part of memory address generation (e.g., for address generation that uses $2^{scale}$*index+base+displacement).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that it is not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement factor field 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement factor field 662B.

Vector memory instructions perform vector loads from and vector stores to memory, with conversion support. As with regular vector instructions, vector memory instructions transfer data from/to memory in a data element-wise fashion, with the elements that are actually transferred being dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement factor field 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the factor field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0×62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of an EVEX.R bit field (EVEX Byte 1, bit [7]—R), EVEX.X bit field (EVEX byte 1, bit [6]—X), and EVEX.B bit field (EVEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 668 Class field (EVEX byte 2, bit [2]-U)—If EVEX.U=0, it indicates class A or EVEX.U0; if EVEX.U=1, it indicates class B or EVEX.U1.

Prefix encoding field 725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
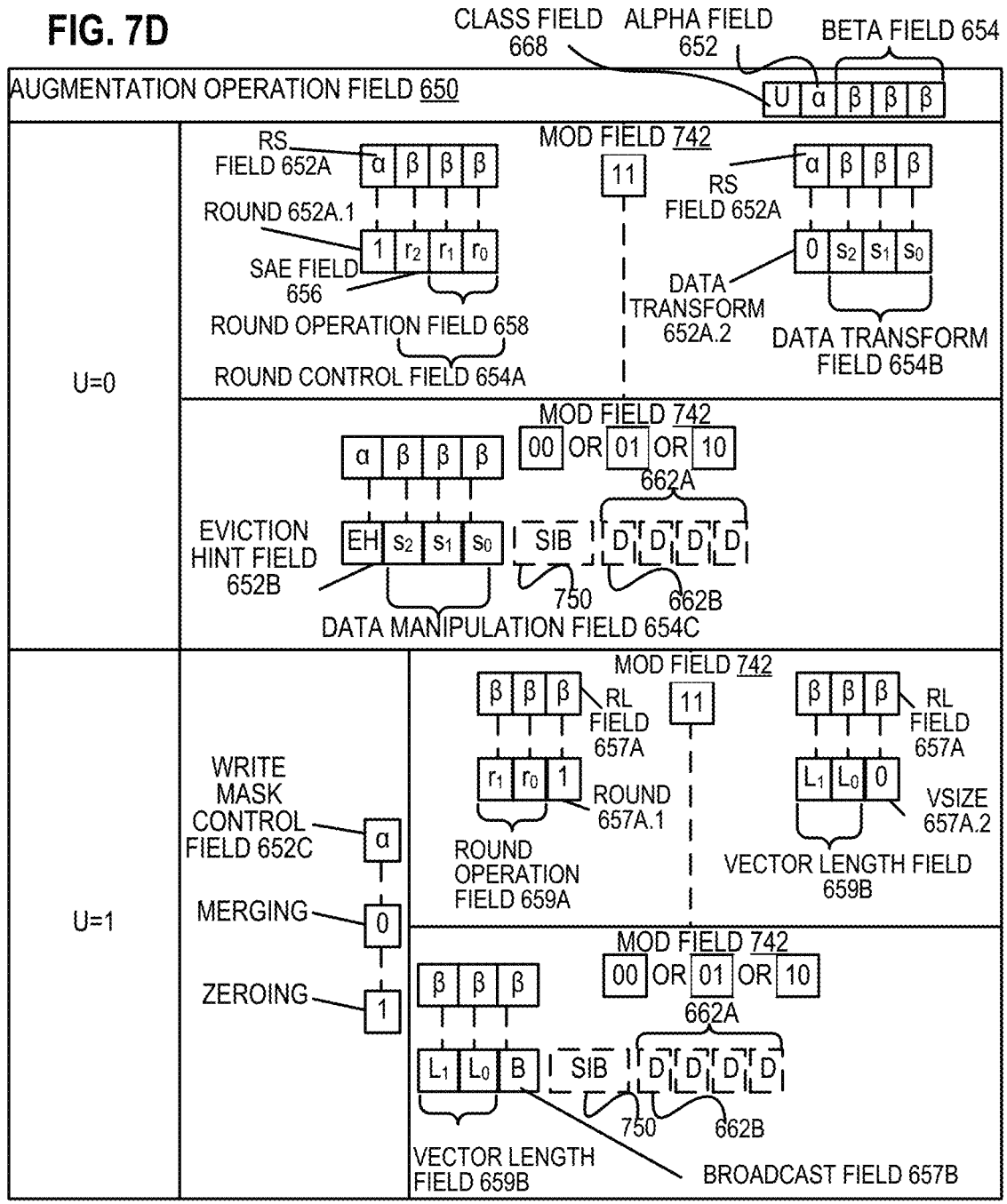
FIG. 7D is a block diagram illustrating the fields of the specific vector friendly instruction format in FIG. 7A that make up the augmentation operation field 650 according to one embodiment of the disclosure.

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

Figure 8:
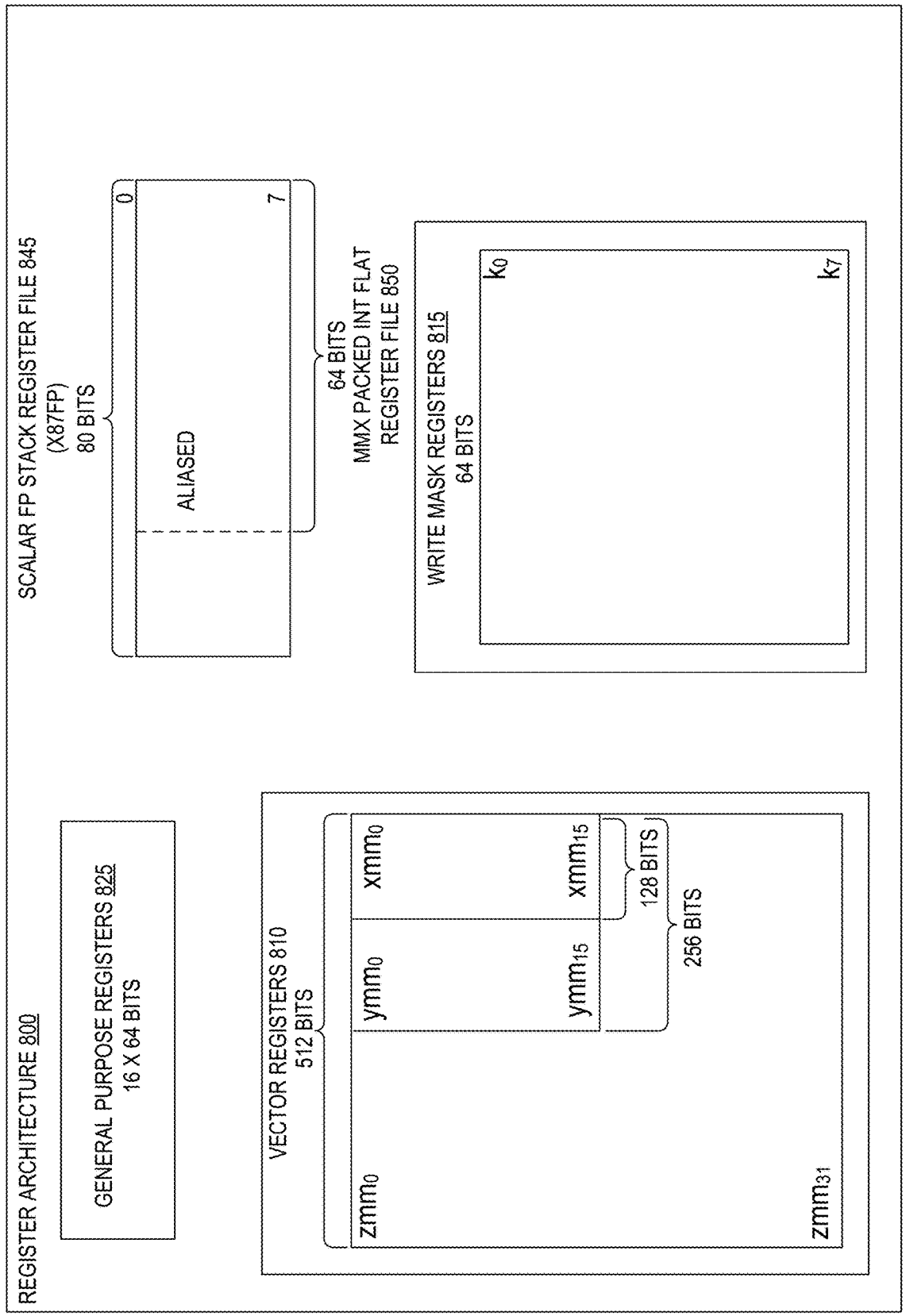
FIG. 8 is a block diagram of a register architecture according to one embodiment of the disclosure.

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |

| Adjustable Vector Length | Class | Operations | Registers |
|---|---|---|---|
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

In certain embodiments, a prefetch circuit 978 is included to prefetch data, for example, to predict access addresses and bring the data for those addresses into a cache or caches (e.g., from memory 980).

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
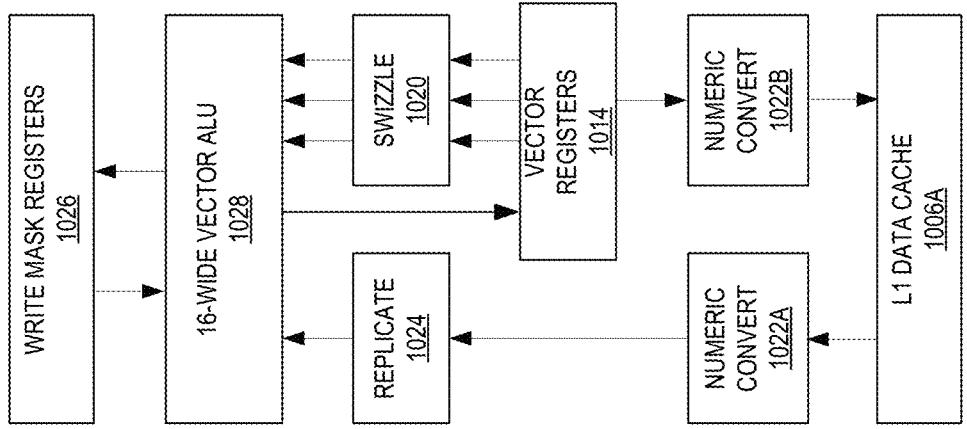
FIG. 10B is an expanded view of part of the processor core in FIG. 10A according to embodiments of the disclosure.
Figure 10A:
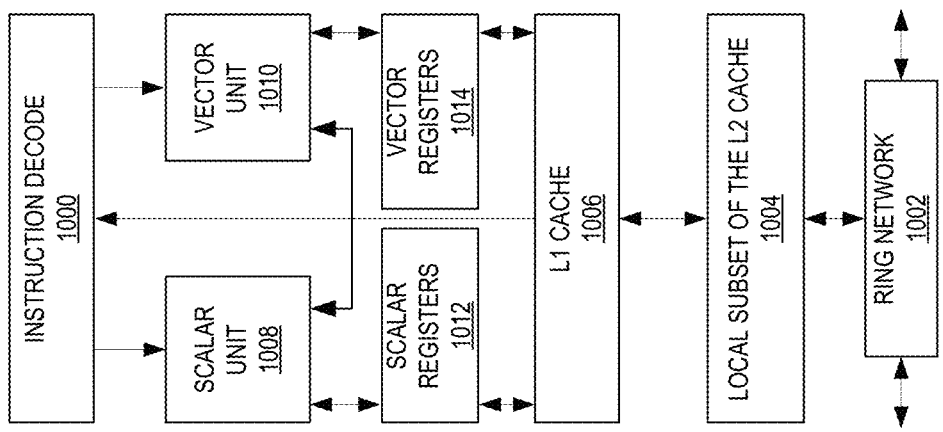
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
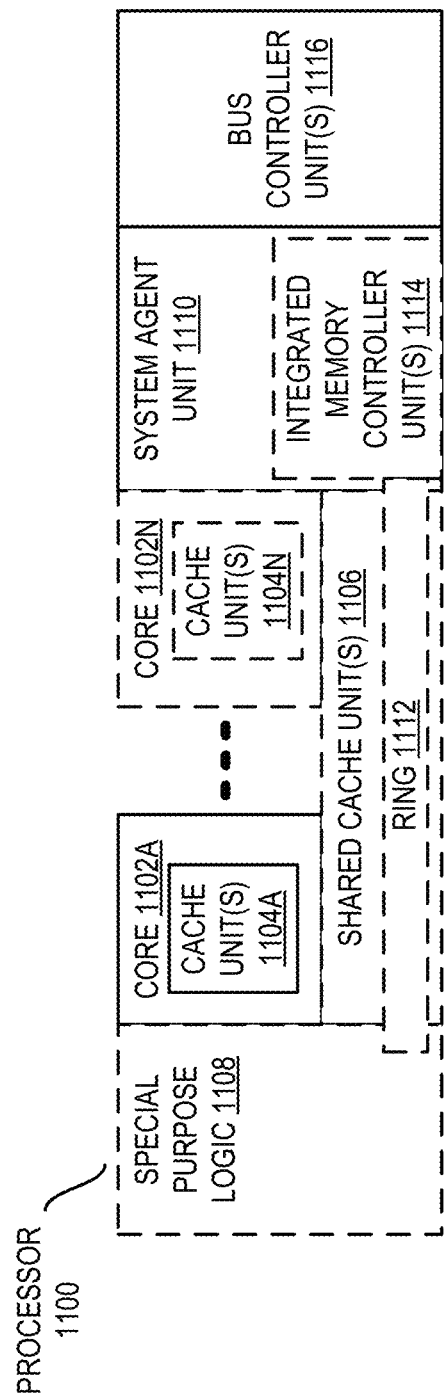
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
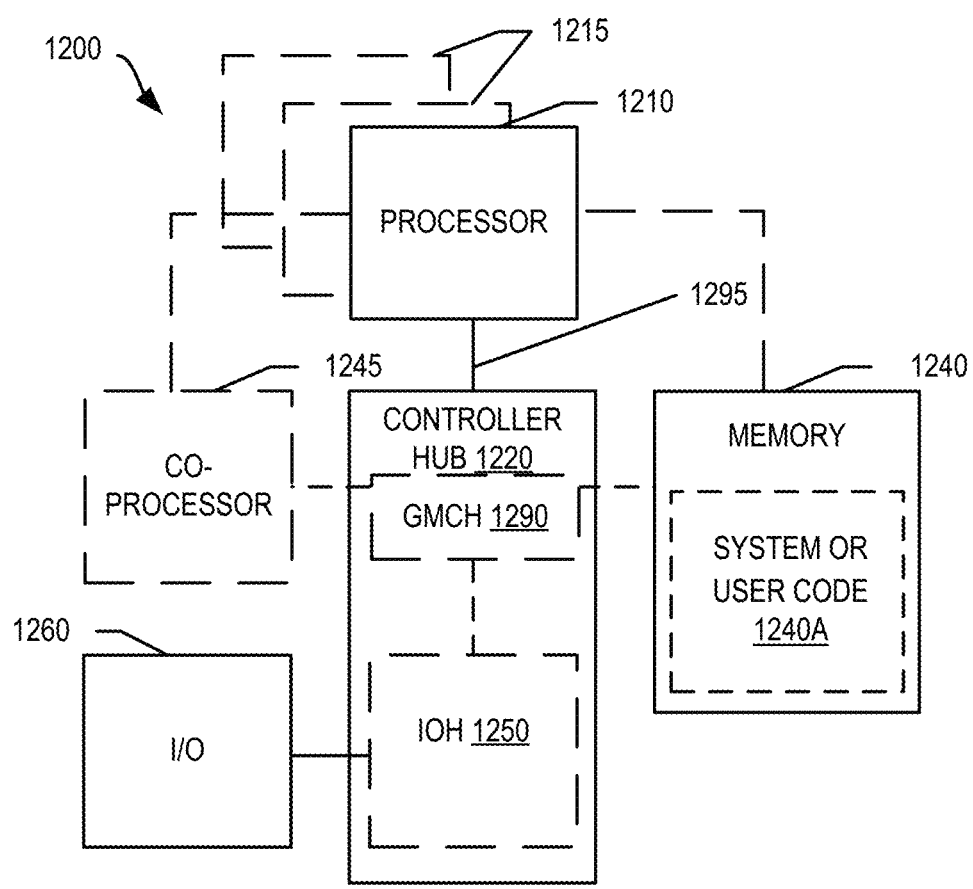
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include supervisor (e.g., operating system) code and/or user code 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
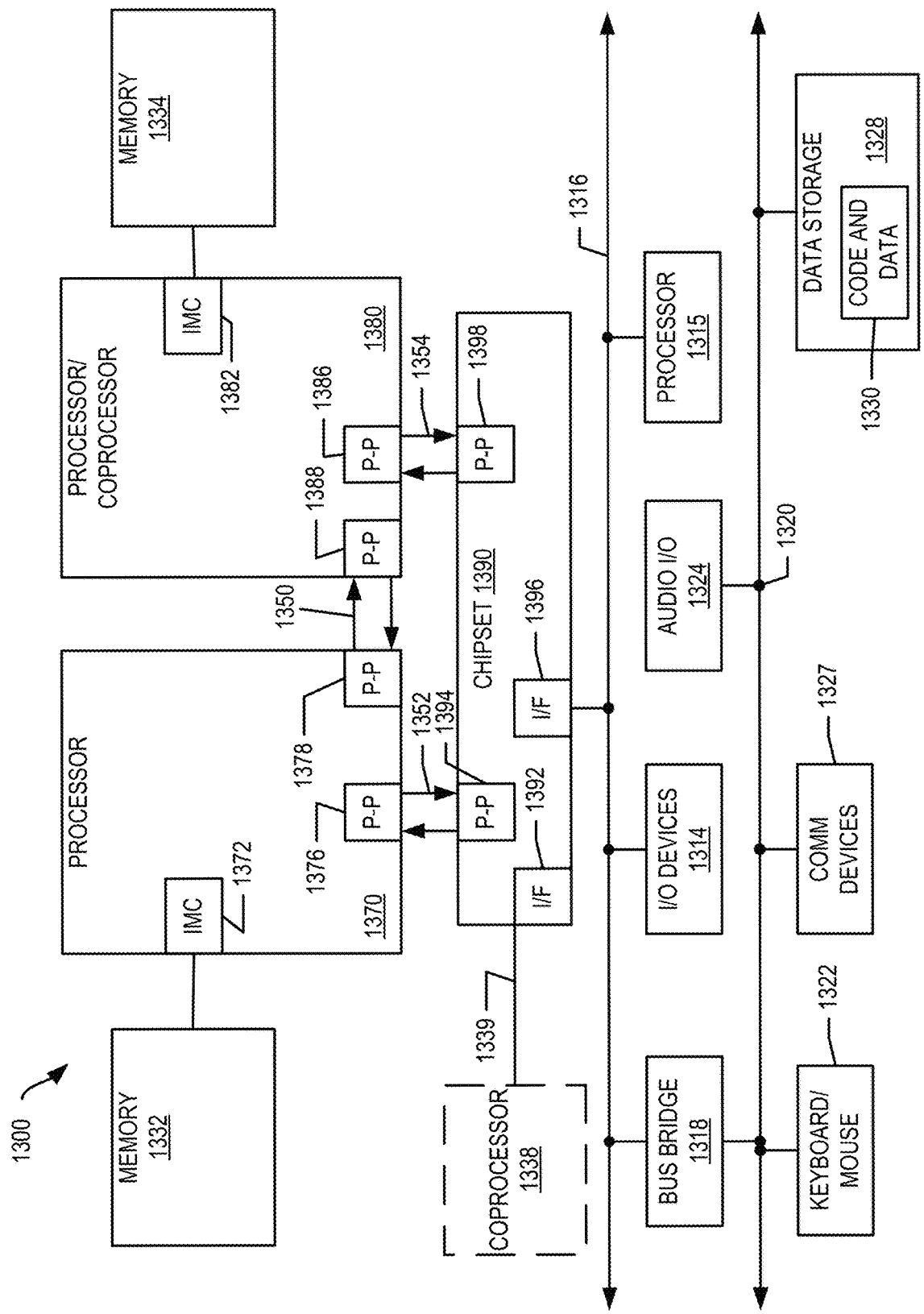
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
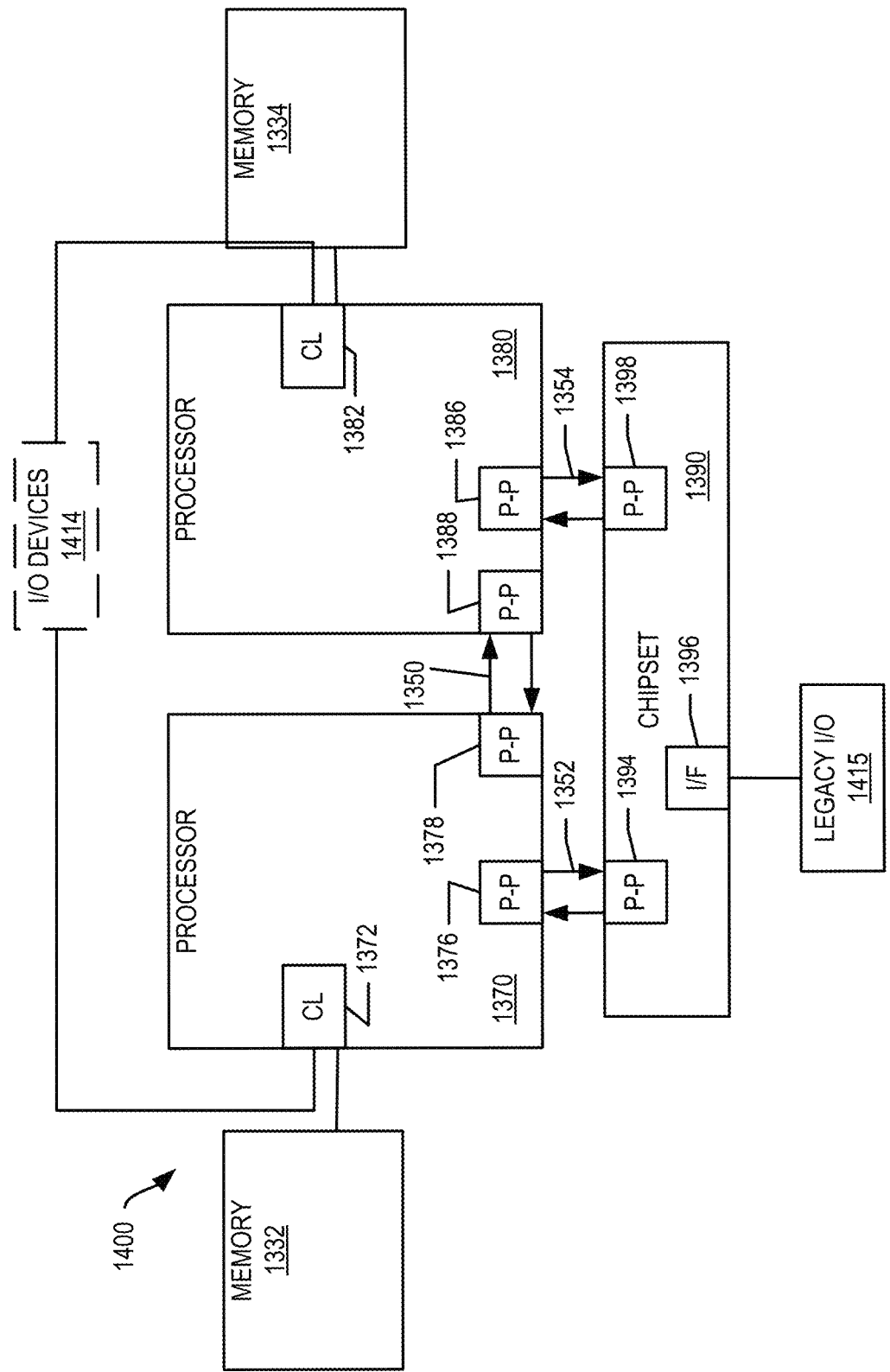
FIG. 14 is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
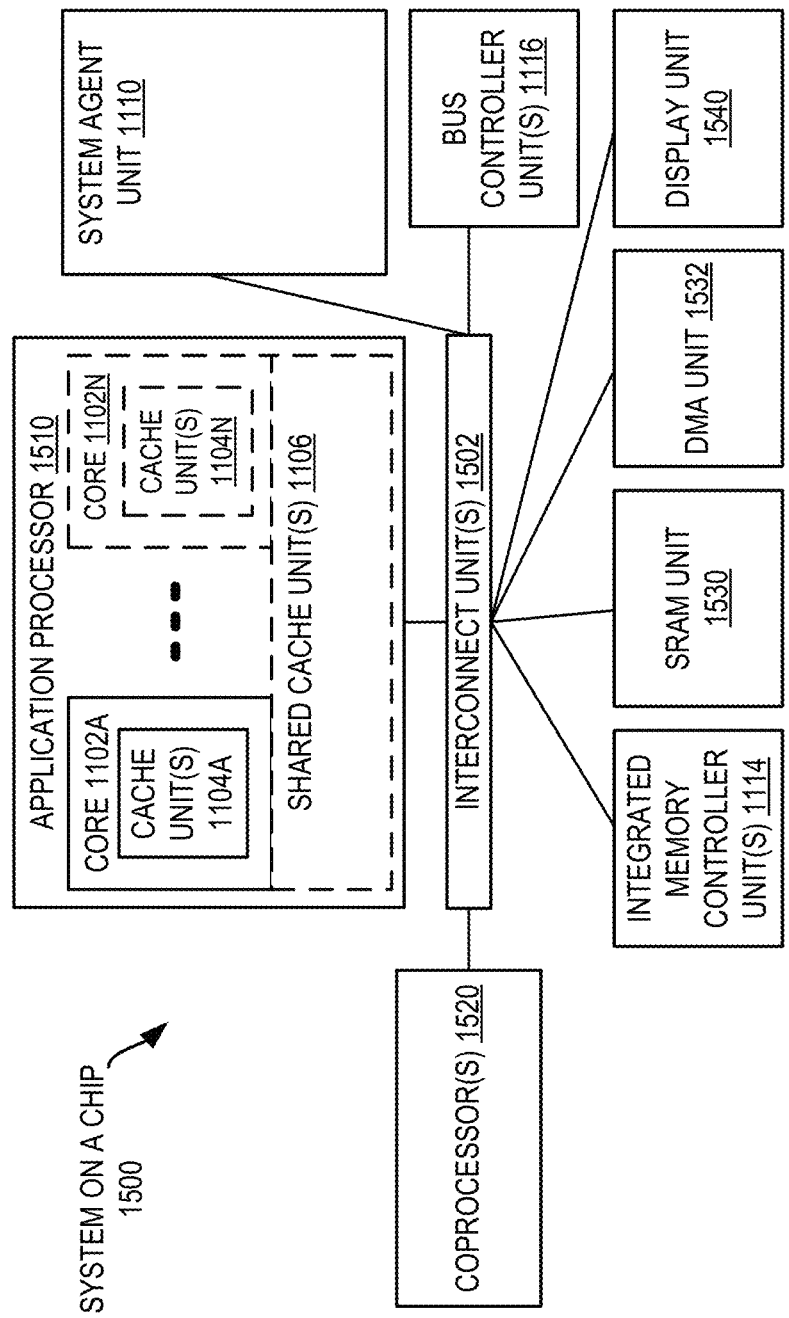
FIG. 15 is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; a static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor. FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. An apparatus comprising:
 a decoder circuit to decode a single packed data instruction into only a first micro-operation and a second micro-operation;
 a packed data execution circuit to execute the first micro-operation and the second micro-operation; and
 a reservation station circuit coupled between the decoder circuit and the packed data execution circuit, the reservation station circuit comprising a first reservation station entry for the first micro-operation to store a first set of fields that indicate three or more input sources and a first destination, and a second reservation station entry for the second micro-operation to store a second set of fields to indicate three or more input sources and a second destination,
 wherein one of:
 the reservation station circuit is to dispatch the first micro-operation for execution by the packed data execution circuit in response to all of the three or more input sources of the first micro-operation being ready for execution, execution of the first micro-operation copies at least one of the three or more input sources to the first destination, one of the three or more input sources of the second micro-operation comprises the first destination, and the reservation station circuit is to dispatch the second micro-operation for execution by the packed data execution circuit in response to all of the three or more input sources of the second micro-operation being ready for execution, execution of the second micro-operation performs an operation on packed data values from two of the three or more input sources of the first micro-operation and packed data values from the three or more input sources of the second micro-operation, or the second reservation station entry for the second micro-operation is to store the second set of fields that further indicate a pointer to the first reservation station entry, and the reservation station circuit is to deallocate both the first reservation station entry for the first micro-operation and the second reservation station entry for the second micro-operation in response to execution of the second micro-operation.

2. The apparatus of claim 1, wherein the single packed data instruction comprises a first source register, a second source register, and a third source register that are each wider than a data-path width of the packed data execution circuit, the three or more input sources of the first micro-operation, and the three or more input sources of the second micro-operation.

3. The apparatus of claim 1, wherein the one is the reservation station circuit is to dispatch the first micro-operation for execution by the packed data execution circuit in response to all of the three or more input sources of the first micro-operation being ready for execution, the execution of the first micro-operation copies the at least one of the three or more input sources to the first destination, the one of the three or more input sources of the second micro-operation comprises the first destination, and the reservation station circuit is to dispatch the second micro-operation for execution by the packed data execution circuit in response to all of the three or more input sources of the second micro-operation being ready for execution.

4. The apparatus of claim 1, wherein the one is the execution of the second micro-operation performs the operation on the packed data values from the two of the three or more input sources of the first micro-operation and the packed data values from the three or more input sources of the second micro-operation.

5. The apparatus of claim 4, wherein the second reservation station entry for the second micro-operation is to store the second set of fields to further indicate one or more registers storing the two of the three or more input sources of the first micro-operation, and the reservation station circuit is not to track the one or more registers to determine if the two of the three or more input sources of the first micro-operation are ready for execution.

6. The apparatus of claim 1, wherein the one is the second reservation station entry for the second micro-operation is to store the second set of fields that further indicate the pointer to the first reservation station entry, and the reservation station circuit is to deallocate both the first reservation station entry for the first micro-operation and the second reservation station entry for the second micro-operation in response to the execution of the second micro-operation.

7. A method comprising:
decoding a single packed data instruction into only a first micro-operation and a second micro-operation with a decoder circuit of a processor comprising a reservation station circuit coupled between the decoder circuit and a packed data execution circuit;
allocating a first reservation station entry in the reservation station circuit for the first micro-operation having a first set of fields that indicate three or more input sources and a first destination;
allocating a second reservation station entry in the reservation station circuit for the second micro-operation having a second set of fields that indicate three or more input sources and a second destination; and
executing the first micro-operation and the second micro-operation from the reservation station circuit with the packed data execution circuit of the processor,
wherein one of:
further comprising dispatching the first micro-operation by the reservation station circuit for execution by the packed data execution circuit in response to all of the three or more input sources of the first micro-operation being ready for execution, the executing of the first micro-operation copies at least one of the three or more input sources to the first destination, one of the three or more input sources of the second micro-operation comprises the first destination, and further comprising dispatching the second micro-operation by the reservation station circuit for execution by the packed data execution circuit in response to all of the three or more input sources of the second micro-operation being ready for execution,
the executing of the second micro-operation performs an operation on packed data values from two of the three or more input sources of the first micro-operation and packed data values from the three or more input sources of the second micro-operation, or
the second set of fields further indicates a pointer to the first reservation station entry, and further comprising deallocating both the first reservation station entry for the first micro-operation and the second reservation station entry for the second micro-operation by the reservation station circuit in response to execution of the second micro-operation.

8. The method of claim 7, wherein the single packed data instruction comprises a first source register, a second source register, and a third source register that are each wider than a data-path width of the packed data execution circuit, the three or more input sources of the first micro-operation, and the three or more input sources of the second micro-operation.

9. The method of claim 7, where the one is the dispatching the first micro-operation by the reservation station circuit for execution by the packed data execution circuit in response to all of the three or more input sources of the first micro-operation being ready for execution, the executing of the first micro-operation copies the at least one of the three or more input sources to the first destination, the one of the three or more input sources of the second micro-operation comprises the first destination, and the dispatching the second micro-operation by the reservation station circuit for execution by the packed data execution circuit in response to all of the three or more input sources of the second micro-operation being ready for execution.

10. The method of claim 7, wherein the one is the executing of the second micro-operation performs an operation on packed data values from two of the three or more input sources of the first micro-operation and packed data values from the three or more input sources of the second micro-operation.

11. The method of claim 10, wherein the second set of fields further indicates one or more registers storing the two of the three or more input sources of the first micro-operation, and further comprising not tracking the one or more registers by the reservation station circuit to determine if the two of the three or more input sources of the first micro-operation are ready for execution.

12. The method of claim 7, wherein the one is the second set of fields further indicates the pointer to the first reservation station entry, and the deallocating both the first reservation station entry for the first micro-operation and the second reservation station entry for the second micro-operation by the reservation station circuit in response to execution of the second micro-operation.

13. An apparatus comprising:
a decoder circuit to decode a single packed data instruction into only a first micro-operation and a second micro-operation;
a first packed data execution circuit to execute the first micro-operation;
a second packed data execution circuit to execute the second micro-operation; and
a reservation station circuit coupled between the decoder circuit and the first packed data execution circuit and the second packed data execution circuit, the reservation station circuit comprising a first reservation station entry for the first micro-operation to store a first set of fields that indicate three or more input sources and a first destination, and a second reservation station entry for the second micro-operation to store a second set of fields to indicate three or more input sources and a second destination,
wherein one of:
the reservation station circuit is to dispatch the first micro-operation for execution by the first packed data execution circuit in response to all of the three or more input sources of the first micro-operation being ready for execution, execution of the first micro-operation copies at least one of the three or more input sources to the first destination, one of the three or more input sources of the second micro-operation comprises the first destination, and the reservation station circuit is to dispatch the second micro-operation for execution by the second packed data execution circuit in response to all of the three or more input sources of the second micro-operation being ready for execution,
execution of the second micro-operation performs an operation on packed data values from two of the three or more input sources of the first micro-operation and packed data values from the three or more input sources of the second micro-operation, or the second reservation station entry for the second micro-operation is to store the second set of fields that further indicate a pointer to the first reservation station entry, and the reservation station circuit is to deallocate both the first reservation station entry for the first micro-operation and the second reservation station entry for the second micro-operation in response to execution of the second micro-operation.

14. The apparatus of claim 13, wherein the single packed data instruction comprises a first source register, a second source register, and a third source register that are each wider than a data-path width of the first packed data execution circuit and the second packed data execution circuit, the three or more input sources of the first micro-operation, and the three or more input sources of the second micro-operation.

15. The apparatus of claim 13, wherein the one is the reservation station circuit is to dispatch the first micro-operation for execution by the first packed data execution circuit in response to all of the three or more input sources of the first micro-operation being ready for execution, execution of the first micro-operation copies the at least one of the three or more input sources to the first destination, the one of the three or more input sources of the second micro-operation comprises the first destination, and the reservation station circuit is to dispatch the second micro-operation for execution by the second packed data execution circuit in response to all of the three or more input sources of the second micro-operation being ready for execution.

16. The apparatus of claim 13, wherein the one is the execution of the second micro-operation performs an operation on packed data values from two of the three or more input sources of the first micro-operation and packed data values from the three or more input sources of the second micro-operation.

17. The apparatus of claim 16, wherein the second reservation station entry for the second micro-operation is to store the second set of fields to further indicate one or more registers storing the two of the three or more input sources of the first micro-operation, and the reservation station circuit is not to track the one or more registers to determine if the two of the three or more input sources of the first micro-operation are ready for execution.

18. The apparatus of claim 13, wherein the one is the second reservation station entry for the second micro-operation is to store the second set of fields that further indicate the pointer to the first reservation station entry, and the reservation station circuit is to deallocate both the first reservation station entry for the first micro-operation and the second reservation station entry for the second micro-operation in response to the execution of the second micro-operation.

* * * * *